United States Patent
Takagi et al.

(10) Patent No.: US 6,587,870 B2
(45) Date of Patent: Jul. 1, 2003

(54) INFORMATION SHARING SYSTEM, AND INFORMATION SHARING SYSTEM MANAGEMENT APPARATUS AND METHOD

(75) Inventors: Tsuneyoshi Takagi, Kawasaki (JP); Toshihiko Fukasawa, Machida (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 08/959,875

(22) Filed: Oct. 29, 1997

(65) Prior Publication Data

US 2002/0002584 A1 Jan. 3, 2002

(30) Foreign Application Priority Data

Oct. 31, 1996 (JP) .............................. 8-289989

(51) Int. Cl.[7] .............................................. G06F 15/16
(52) U.S. Cl. ...................... 709/204; 709/213; 370/260
(58) Field of Search ................................ 709/208, 213, 709/214, 217, 218, 226, 204, 205; 707/10; 345/329, 330, 331, 332, 15, 2; 370/260

(56) References Cited

U.S. PATENT DOCUMENTS

| | | | | |
|---|---|---|---|---|
| 4,025,851 A | * | 5/1977 | Haselwood et al. | 325/31 |
| 4,455,455 A | * | 6/1984 | Little | 179/7.1 |
| 4,546,467 A | * | 10/1985 | Yamamoto | 370/13 |
| 4,691,347 A | * | 9/1987 | Stanley et al. | 379/203.01 |
| 5,099,510 A | * | 3/1992 | Blinken, Jr. et al. | 379/202.01 |
| 5,113,431 A | * | 5/1992 | Horn | 379/93.14 |
| 5,163,136 A | * | 11/1992 | Richmond | 395/275 |
| 5,276,851 A | * | 1/1994 | Thacker et al. | 395/425 |
| 5,310,349 A | * | 5/1994 | Daniels et al. | 434/350 |
| 5,440,624 A | * | 8/1995 | Schoof, II | 379/202.01 |

(List continued on next page.)

OTHER PUBLICATIONS

Greif, Irene et al., "Data Sharing in Group Work", ACM Transactions on Information Systems, vol. 5, iss. 2, pp. 187–211, Apr. 1987.*

Vin, H. M. et al., "Hierarchical Conferencing Architectures for Inter–Group Multimedia Collaboration", ACM Conference on Supporting Group Work, pp. 43–54, Nov. 1991.*

(List continued on next page.)

*Primary Examiner*—Zarni Maung
*Assistant Examiner*—Jason D. Cardone
(74) *Attorney, Agent, or Firm*—Morgan & Finnegan, LLP

(57) ABSTRACT

This invention provides an information sharing system management apparatus which efficiently manages a TV conference without requiring the user to join it. When a terminal A1 is started, a first system acquires information such as the start time, participants, and the like of a video conference system from that video conference system, and transmits the acquired information to a second system on a terminal A0. The second system stores the received information. When the operator inputs a conference record command on the terminal A1, the first system requests the video conference system to send a conference record including speech and the like, and transmits the received conference record to the second system. The second system stores the received conference record. The operator at the terminal A0 can display and observe the conference information and conference record stored by the second system as needed. Such information is updated every required times.

28 Claims, 25 Drawing Sheets

U.S. PATENT DOCUMENTS

| | | | | |
|---|---|---|---|---|
| 5,598,541 A | * | 1/1997 | Malladi | 395/286 |
| 5,619,555 A | * | 4/1997 | Fenton et al. | 379/88.11 |
| 5,668,863 A | * | 9/1997 | Bieselin et al. | 379/202 |
| 5,669,391 A | * | 9/1997 | Williams | 128/697 |
| 5,673,393 A | * | 9/1997 | Marshall | 709/226 |
| 5,689,553 A | * | 11/1997 | Ahuja et al. | 379/202 |
| 5,710,591 A | * | 1/1998 | Bruno et al. | 348/14.09 |
| 5,719,786 A | * | 2/1998 | Nelson et al. | 709/219 |
| 5,779,549 A | * | 7/1998 | Walker et al. | 463/42 |
| 5,790,179 A | * | 8/1998 | Shibata et al. | 348/15 |
| 5,838,912 A | * | 11/1998 | Poon et al. | 709/204 |
| 5,848,067 A | * | 12/1998 | Osawa et al. | 370/394 |
| 5,854,893 A | * | 12/1998 | Ludwig et al. | 709/204 |
| 5,867,559 A | * | 2/1999 | Jorgensen et al. | 379/67.1 |
| 5,867,653 A | * | 2/1999 | Aras et al. | 709/204 |
| 5,889,945 A | * | 3/1999 | Porter et al. | 709/204 |
| 5,907,324 A | * | 5/1999 | Larson et al. | 345/753 |
| 5,974,446 A | * | 10/1999 | Sonnenreich et al. | 709/204 |
| 5,995,095 A | * | 11/1999 | Ratakonda | 345/328 |
| 5,996,003 A | * | 11/1999 | Namikata et al. | 709/205 |
| 6,035,332 A | * | 3/2000 | Ingrassia, Jr. et al. | 709/224 |
| 6,038,296 A | * | 3/2000 | Brunson et al. | 379/100.11 |
| 6,154,764 A | * | 11/2000 | Nitta et al. | 709/200 |
| 6,167,432 A | * | 12/2000 | Jiang | 709/204 |
| 6,195,091 B1 | * | 2/2001 | Harple et al. | 345/751 |
| 6,195,357 B1 | * | 2/2001 | Polcyn | 370/401 |
| 6,286,034 B1 | * | 9/2001 | Sato et al. | 709/204 |
| 6,317,777 B1 | * | 11/2001 | Skarbo et al. | 709/204 |

OTHER PUBLICATIONS

Abbott, K. R. et al., "Experiences with workflow management: Issues for the Next Generation", ACM Computer Supported Cooperative Work, pp. 113–120, Oct. 1994.*

Rajan, S. et al., "A Formal Basis for Structured Multimedia Collaborations", IEEE Proceedings on Multimedia Computing and Systems, ISBN: 0–8186–7105–X, pp. 194–201, May 1995.*

* cited by examiner

PRIOR ART

INFORMATION SHARING SYSTEM, AND INFORMATION SHARING SYSTEM MANAGEMENT APPARATUS AND METHOD

BACKGROUND OF THE INVENTION

The present invention relates an information sharing system for centrally managing a groupware system (information sharing system) for sharing information, such as a video conference system that runs on information processing apparatus connected to a network, and an information sharing system management apparatus and method.

Recently, groupware systems such as a video conference system, a remote lecture system, and the like using personal computers (PCs) and workstations have become popular. This is a system for sharing information at a plurality of sites on the network. Among these systems, in the video conference system, images sensed by cameras and voices input by microphones connected to each other's terminals are exchanged to talk and exchange opinions among a plurality of sites. Furthermore, the system has a function of sharing each other's screens by exchanging commands for images on the screens and application software programs.

Also, a video conference system having a conference management function that can hold a plurality of conferences is also available. In this case, a server for the video conference system is installed on a given terminal on the network, and the participants of a given conference can know the presence of other conferences by sharing conference information managed by the server.

However, in the conventional video conference system, a list of conferences that are in progress and their contents can be referred to, but the contents of past conferences cannot be referred to unless a conference recording system is started in addition to the conference management system. Also, there is no means that can link the past conferences to those that are in progress.

FIGS. 21A to 21C show an example of the relationship between conferences held by the video conference system, and the conference management system. FIG. 21A shows an example of the conference management system that links conferences A and B that are in progress. In this system, when a user who is taking part in conference A also wants to join conference B and to exchange data common to the two conferences, the users must join both the conferences. However, when messages need only be exchanged, it is wasteful to join both the conferences for that purpose only, and this results in low work efficiency such as a low throughput of the system.

FIG. 21B shows a state wherein a certain conference repetitively suspends and resumes, and transits to conferences 1, 2, and 3. In this case, in the prior art, when the conference suspends, the conference state is saved to end the conference, and when the conference resumes, the saved conference state is loaded to continue the suspended conference. However, in some cases, the conference continues with identical members, and digests of the previous conferences need only be referred to. In such case, the contents at the end of the previous conference need not be faithfully reproduced as the contents of the resumed conference. The faithful reproduction of the conference is time-consuming, resulting in low work efficiency.

FIG. 21C shows an example wherein a certain user looks on a conference that is in progress from the conference management system. In the prior art, in order to recognize the contents of the conference, the user must join the conference itself and cannot remain a so-called spectator. For this reason, when the user merely observes the contents of the conference or makes only simple comments, he or she does not fully use the functions of the video conference system and the resource of the system is wasted.

Furthermore, no conference management system that can systematically implement conference management patterns shown in FIGS. 21A to 21C has been available to date.

SUMMARY OF THE INVENTION

The present invention has been made in consideration of the above-mentioned prior art, and has as its object to provide an information sharing system, and an information sharing system management apparatus and method, which allow a user to refer to the history of a conference without joining an information sharing system such as a conference and to refer to the history and participate in functions of, e.g., a conference that are in progress by a single system, and can prevent a decrease in work efficiency.

It is another object of the present invention to provide an information sharing system, and an information sharing system management apparatus and method, which can suspend the functions of, e.g., a conference that is in progress without ending them so as to obviate the need for processing required for saving and resuming the state of the conference, and can improve work efficiency.

It is still another object of the present invention to provide an information sharing system, and an information sharing system management apparatus and method, which can exchange information between conferences (groupware systems) without requiring a user to join a plurality of conferences (groupware systems) at the same time, and can prevent a decrease in work efficiency.

It is still another object of the present invention to realize an information sharing system, and an information sharing system management apparatus and method, which allows a user who is not a member of a conference (groupware system) to make a comment on the conference (groupware system), and can prevent a decrease in work efficiency.

It is still another object of the present invention to provide an information sharing system management apparatus for managing at least one information sharing system that shares information by a plurality of terminals, comprising:

reception means for receiving status information and/or history information from the information sharing system;

storage means for storing the status information and/or history information received by the reception means; and output means for reading out the stored status information and/or history information of the information sharing system and outputting status or history data of the information sharing system.

It is still another object of the present invention to provide an information sharing system management method for managing at least one information sharing system that shares information by a plurality of terminals connected via a network, comprising:

the reception step of receiving status information and/or history information from the information sharing system;

the storage step of storing the status information and/or history information received in the reception step; and the output step of reading out the stored status information and/or history information of the information sharing system and outputting status or history data of the information sharing system.

It is still another object of the present invention to provide an information sharing management system comprising a first management system which manages an information sharing system running on a terminal device connected to a network, and runs on the terminal device, and a second management system on another terminal device, the first management system comprising:
first message reception means for receiving a message from the information sharing system or the second management system;
information acquisition means for acquiring status information associated with the information sharing system;
history generation means for generating history information of the information sharing system;
first message generation means for generating a first message on the basis of the status information acquired by the information acquisition means or the history information generated by the history information generation means; and
first message transmission means for transmitting the first message generated by the first message generation means onto the network, and the second management system comprising:
second message reception means for receiving a message from the first management system;
storage means for storing contents of the received message; and
output means for outputting status information or history information stored in the storage means.

It is still another object of the present invention to provide a computer readable storage medium that stores a program for managing at least one information sharing system that shares information by a plurality of terminals connected via a network, the program including:
reception means for receiving status information and/or history information from the information sharing system;
storage means for storing the status information and/or history information received by the reception means; and
output means for reading out the stored status information and/or history information of the information sharing system and outputting status or history data of the information sharing system.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

First Embodiment

An embodiment of the present invention will be described in detail hereinafter with reference to the accompanying drawings.

System Arrangement

Figure 3:
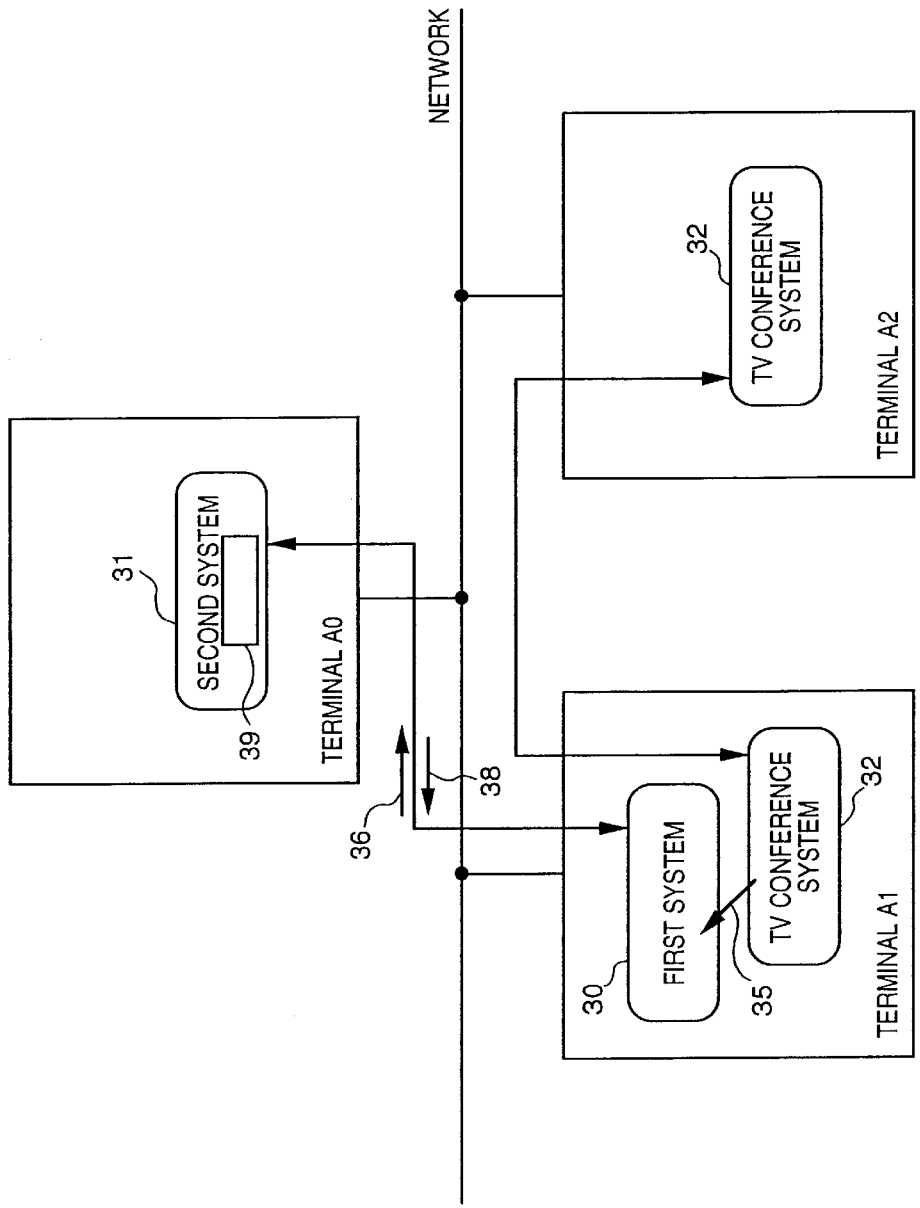
FIG. 3 is a diagram showing an environment in which existing video conference systems are running among terminals connected to a network.

This embodiment will explain a TV (television) conference management system in which a user who operates a terminal A0 can refer to information associated with a video conference system which is in progress between terminals A1 and A2, and can transmit a comment or message in an environment wherein existing video conference systems 32 are running between terminals connected to a network, as shown in FIG. 3.

In FIG. 3, a first subsystem (to be simply referred to as a first system hereinafter) 30 included in the TV conference management system of the present invention is running on the terminal A1 corresponding to the chairperson of the TV conference. On the terminal A0, a second subsystem (to be simply referred to as a second system hereinafter) 31 included in the TV conference management system is running. The first system 30 obtains information 35 associated with the TV conference, and informs the second system 31 of the contents of the TV conference as conference information 36. The second system 31 stores the conference information 36 sent from the first system 30 in a storage unit 39, and provides the stored information in accordance with a user's request. The second system 31 has a message generation function, and can transmit the generated message to the first system 30. Upon receiving a message 38 from the second system 31, the first system 30 outputs the received message to a display.

Figure 4:
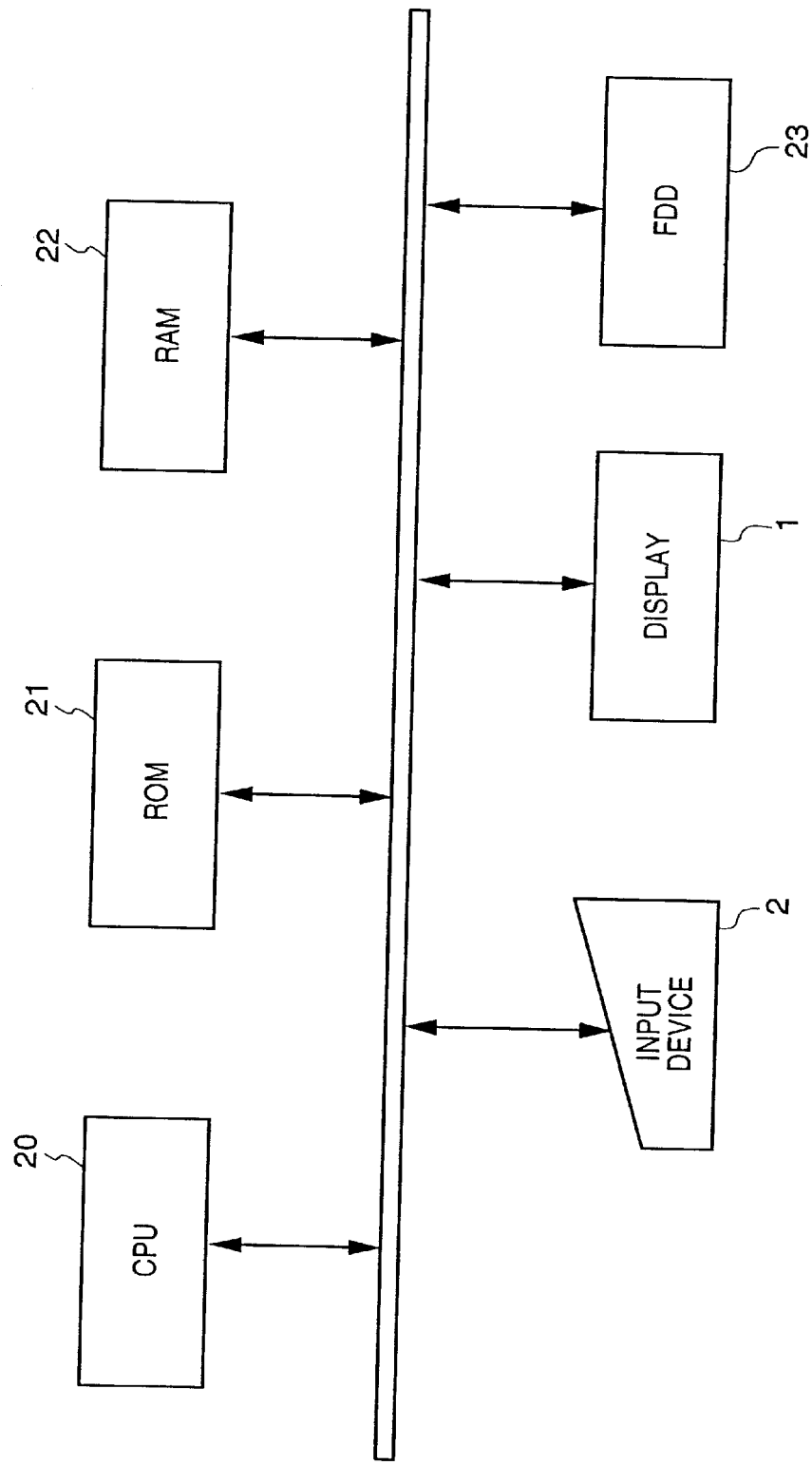
FIG. 4 is a block diagram showing the hardware arrangement of a conference management apparatus shown in FIGS. 1 and 2.

Note that each terminal has a hardware arrangement, as shown in FIG. 4.

Referring to FIG. 4, a CPU 20 performs various kinds of control of a RAM 22, input device 2, display 1, and FDD 23 in accordance with programs stored in a ROM 21. The ROM 21 stores various programs for executing processing of data input from the input device 2 and processing of the CPU 20. Also, the ROM 21 stores a program for implementing the first system 30 and a program for implementing the second system, which are executed under the control of the CPU 20. The contents of these programs will be described later. Furthermore, the ROM 21 stores a program that implements the video conference system 32. The RAM 22 serves as a work area and a temporary saving area of various programs and data input by the input device 2. The storage unit 39 in which the second system stores the conference information is assured on the RAM 22. The programs and data may be stored in the RAM 22 in place of the ROM 21.

The FDD (floppy disk drive) 23 can read/write data from/to an inserted floppy disk (FD). Also, programs shown in the flow charts (FIGS. 6 to 12; to be described later) may be written in an inserted FD (not shown), and may be loaded onto the RAM 22 of this apparatus to execute processing. In this embodiment, the programs are stored in the ROM 21, and are loaded from the ROM 21 to the RAM 22 under the control of the CPU 20, thus executing processing flows (to be described later).

Note that a CD-ROM drive or HDD may be arranged in place of the FDD 23, and processing may be executed by storing the above-mentioned programs in a CD-ROM or HD which is inserted or built in such drive, and reading out the stored programs.

Software Configuration of System

The software configuration in this embodiment will be described below.

Figure 1:
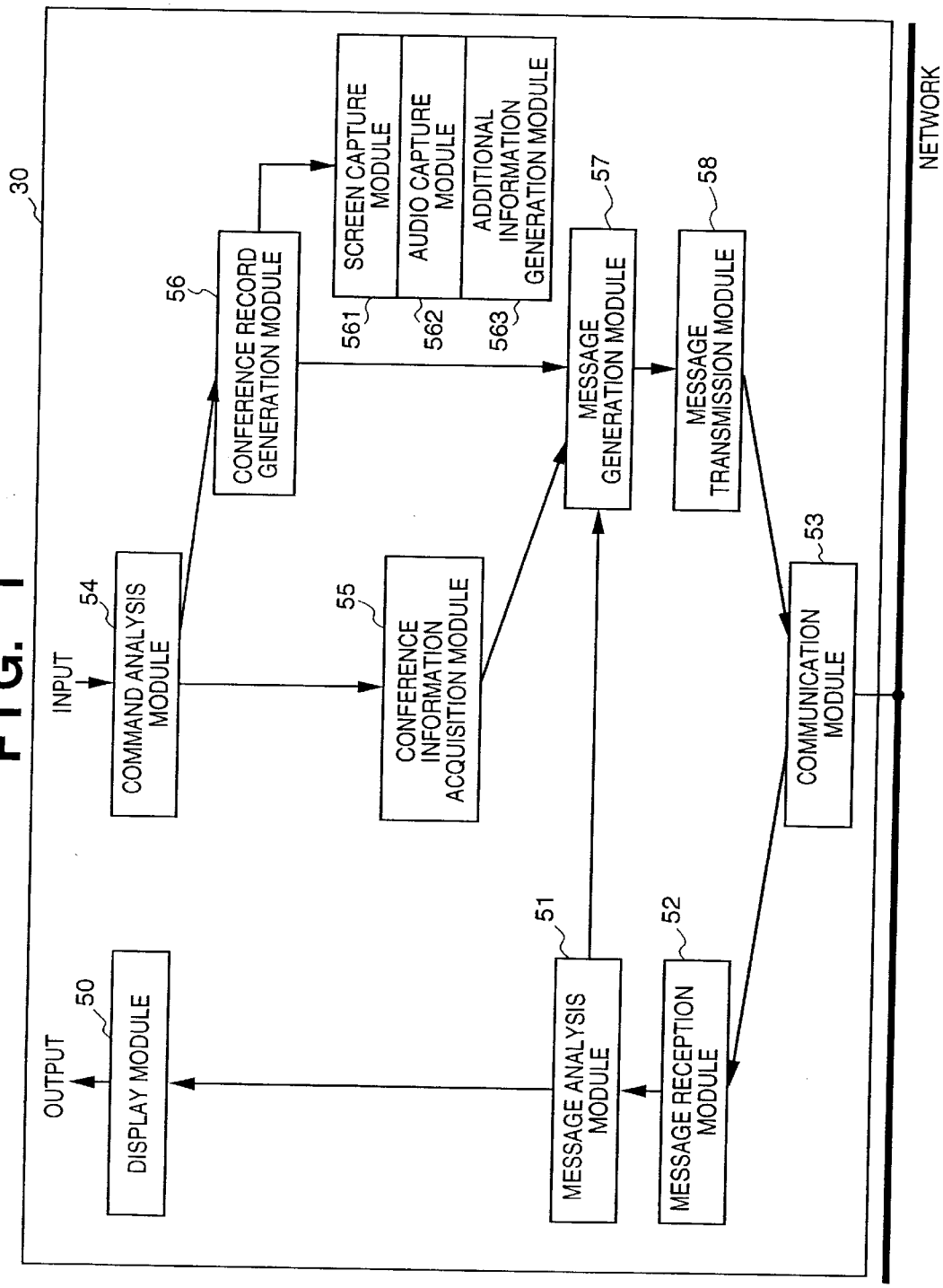
FIG. 1 is a block diagram showing the module arrangement for realizing a first system according to an embodiment of the present invention.
Figure 2:
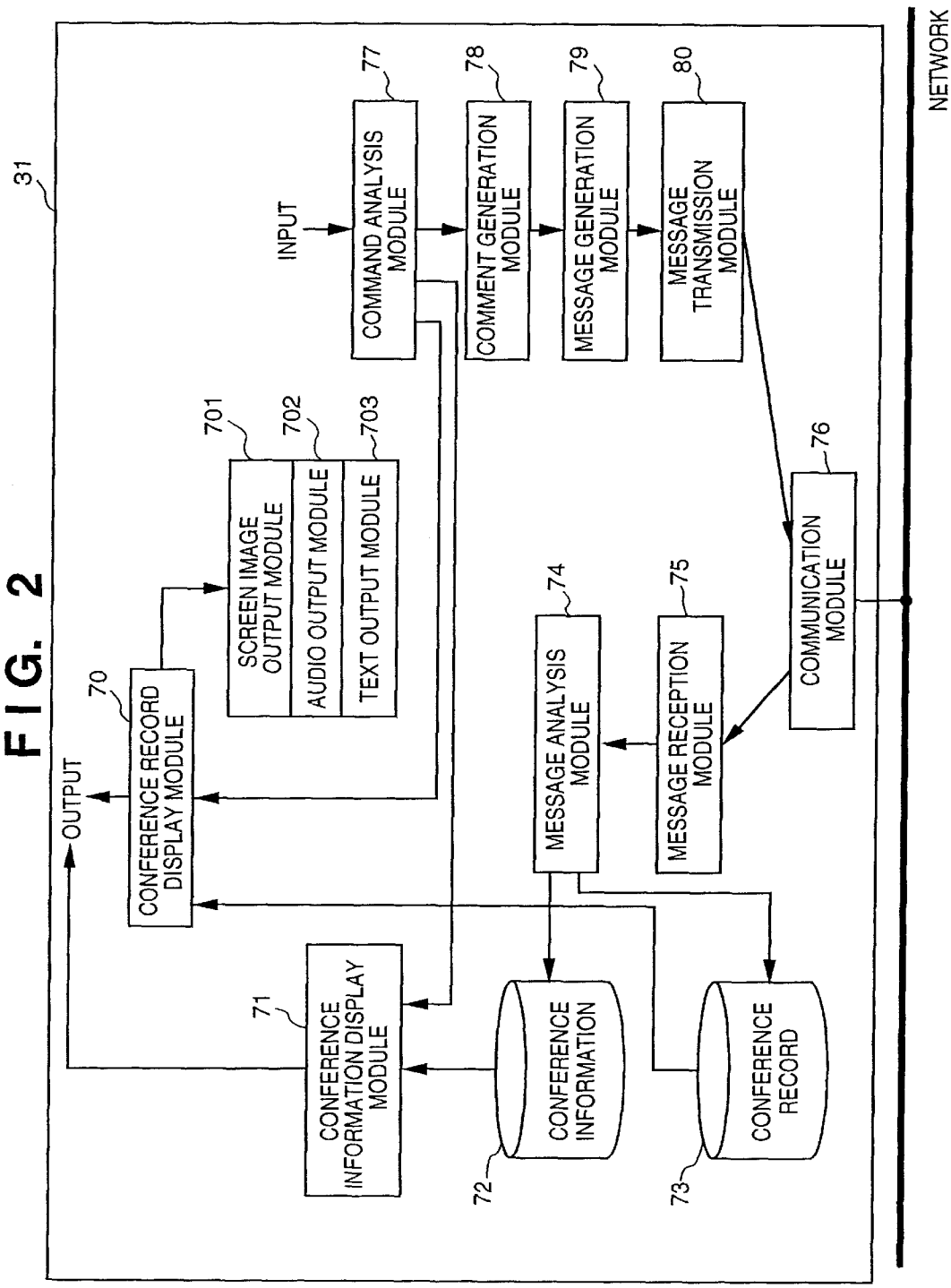
FIG. 2 is a block diagram showing the module arrangement for realizing a second system according to the embodiment of the present invention.

FIGS. 1 and 2 are block diagrams showing the module arrangements for respectively implementing the first and second systems 30 and 31 in this embodiment.

First System

Modules that make up the first system shown in FIG. 1 will be explained below. In the first system 30, a communication module 53 which performs message communications with the second system 31 on the terminal A0 is connected to the network. A message transmitted from the second system 31 is received by a message reception module 52 via the communication module 53, and the received message is transferred to a message analysis module 51. The contents of the message analyzed by the message analysis module 51 are supplied to a display module 50, and are displayed on the display 1.

The communication module 53 performs communications via a socket to exchange messages. In socket communications, an identical communication protocol is used independently of the presence/absence of a physical network, and even between processes on a single terminal, all the communications are done as if they were done via the network. In this case, the processing route of the received message is the same as that of the message received from the second system 31.

An input from the input device 2 to the first system 30 is received by a command analysis module 54. If the received command is a command requesting acquisition of information associated with the video conference system 32 and informing the second system 31 of the obtained information, that command is supplied to a conference information acquisition module 55. Upon reception of the command, the conference information acquisition module 55 controls a message generation module 57 to generate a message for obtaining conference information including the conference name, member list, start time, and the like, and issues it to the video conference system 32. When a response to that message has been received from the video conference system 32, the message analysis module 51 requests the message generation module 57 to generate a message attached with the obtained conference information.

Note that the conference information can also be acquired from the video conference system 32 using inter-program communications, but can be input by the user via the input device 2. The user inputs the conference information when the first system 30 cannot directly communicate with the video conference system 32. In such case, the command analysis module 54 transfers the input conference information to the conference information acquisition module 55, and a message is generated when conference information is collected.

Upon obtaining the conference information, the message generation module 57 generates a message for conference information communications, and transfers it to a message transmission module 58. The message transmission module 58 transmits the generated conference information message to the second system 31 via the communication module 53.

If the command input from the input device is a command requesting generation of a conference record and transmission of it to the second system 31, that command is supplied to a conference record generation module 56. The conference record generation module 56 causes the message generation module 57 to generate a message for acquiring records (a hard copy of the screen, voice conversations, addition information input as a text, and the like) of the conference at the time of the request, and issues the message to the video conference system 32. Upon reception of a response from the video conference system 32, the response is supplied to the message generation module 57 to generate a conference record message, which is transmitted to the second system 31.

In the above description, the conference record generated by the video conference system 32 is acquired using inter-program communications, but may be generated by the first system 30. In this case, the conference record generation module 56 generates a conference record on the basis of information collected by a screen capture module 561, an audio capture module 562, and an additional information generation module 563, and supplies it to the message generation module 57 to generate a conference record message. When the conference record is acquired from the video conference system 32 using inter-program communications, conference record generation by the conference record generation module 56 is omitted.

Upon obtaining the conference record, the message generation module 57 generates a conference record message for conference record communications, and transfers it to the message transmission module 58. The message transmission module 58 transmits the message to the second system 31 via the communication module 53.

Second System

Modules that make up the second system 31 shown in FIG. 2 will be explained below. In the second system 31, a communication module 76 that performs message communications with the first system 30 on the terminal A1 is connected to the network. A message from the first system 30 is received by a message reception module 75 via the communication module 76. The message reception module 75 transfers the received message to a message analysis module 74. If the contents of the message analyzed by the message analysis module 74 are to inform conference information, the message analysis module 74 extracts conference information from the message, and stores it in a storage module 72 (which may be an external storage device) for storing the conference information. If the contents of the analyzed message are to inform a conference record, the message analysis module 74 extracts a conference record from the message, and writes it in a storage module 73 (which may be an external storage device) for storing the conference record.

An input from the input device 2 is received by a command analysis module 77. If the received command is a command requesting display of the conference information, that command is supplied to a conference information display module 71. Upon reception of the command, the conference information display module 71 reads out the conference information from the storage module 72 that stores the conference information, and displays the readout contents on the display 1. If the input command is a command requesting display of the conference record, that command is supplied to a conference record display module 70. Upon reception of the command, the conference record display module 70 reads out the conference record from the storage module 73 that stores the conference record, and displays the readout contents on the display 1.

If the input command is a command requesting generation of a comment on the conference in progress in the video conference system 32, that command is supplied to a comment generation module 78. Upon reception of the command, the comment generation module 78 generates a comment in accordance with an input from the input device 2 via the command analysis module 77. The generated comment is supplied to a message generation module 79 to generate a comment message for informing the comment. The comment message is supplied to a message transmission module 80, and is transmitted to the first system 30 via the communication module 76.

Message Exchange Sequence Among TV Conference System, First System, and Second System An example of the operation sequence of the individual systems in this embodiment will be described below with reference to FIG. 5.

At timing T0, the second system 31 is started on the terminal A0, and waits for a connection request from the first system 30. Timing T0 need only be set before the connection request from the first system. At timing T1, the video conference system 32 is started on the terminals A1 and A2. Around timing t1, the first system 30 is started on the terminal A1, and transmits a conference information request message to the video conference system 32 after the system 32 is started. In this embodiment, the first system 30 is started on the terminal A1 but may be started on the terminal A2.

Upon reception of the conference information request message, the video conference system 32 generates a message of conference information including the name of the conference (if not available, it may be blank, or a name that can identify it such as "No name", or the like may be assigned), start time, member name list, and the like, and transmits the message to the first system 30.

The first system 30 can be started automatically when the video conference system 32 is started, or can be started in response to a command input by the user. Exchange of messages between the first system 30 and the video conference system 32 is effective only when the video conference system 32 has that function. If the video conference system 32 does not have such function, the user inputs the conference information to the first system 30.

Upon obtaining the conference information, the first system 30 issues a connection request to the second system 31, which is running on the terminal A0, at timing T2, and as a consequence, the first and second systems 30 and 31 are connected via the network. Upon completion of the connection, the first system 30 generates a conference information message and transmits it to the second system 31 at timing T3. Upon reception of the conference information message, the second system 31 registers the conference information on the basis of the contents of the received message, generates a conference ID corresponding to the conference information, and transmits it as a message to the first system 30. The conference ID is defined by contents that can uniquely specify a given one of a plurality of conferences in progress on the network, e.g., a combination of the date and sequential number.

The TV conference is in progress on the terminals A1 and A2. At timing T4, the first system 30 transmits a conference record request message to the video conference system 32. The conference record is requested when the user instructs (inputs a command to) the first system 30, when a predetermined timing in the first system 30 has been reached, or when the video conference system 32 automatically outputs a conference record. When the video conference system 32 automatically outputs the conference record, if an event is generated such as switching of speakers, turning of pages of a reference, or the like, the video conference system informs the first system of the event, and a conference record is requested on the basis of that information. The number of conference record request messages after timing T4 is not particularly limited.

Upon requesting the conference record (timing T4 in FIG. 5), when the first system 30 cannot communicate with the video conference system 32, the first system 30 generates a conference record. The conference record may be generated automatically or in response to the user's instruction (by inputting a command) (timing T5 in FIG. 5).

Upon reception of the conference record request message, the video conference system 32 transmits a conference record (screen shot, voice conversations, text input) at the reception timing of that message as a message to the first system 30. The first system 30 transmits the received conference record or the conference record generated by itself as a message to the second system 31 on the terminal A0. The conference record is stored in the conference record storage module 73 in the second system 31.

At timing T6, the user who is operating the terminal A0 makes a comment on the conference with reference to the conference information delivered at timing T3 or the conference records delivered at timings T4 and T5.

Figure 16:
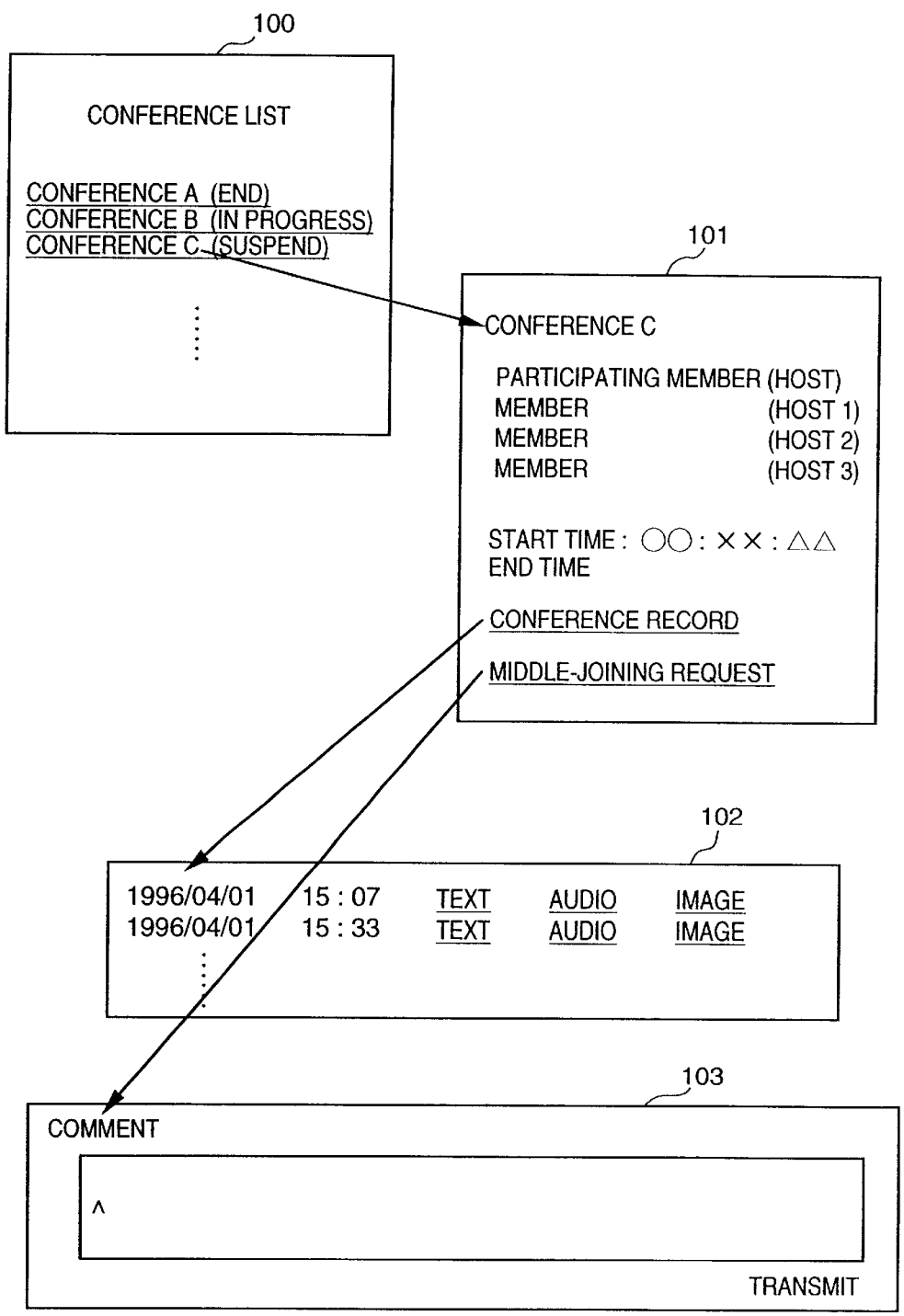
FIG. 16 is a shows conference information and the state of the conference record displayed on the screen.
Figure 17:
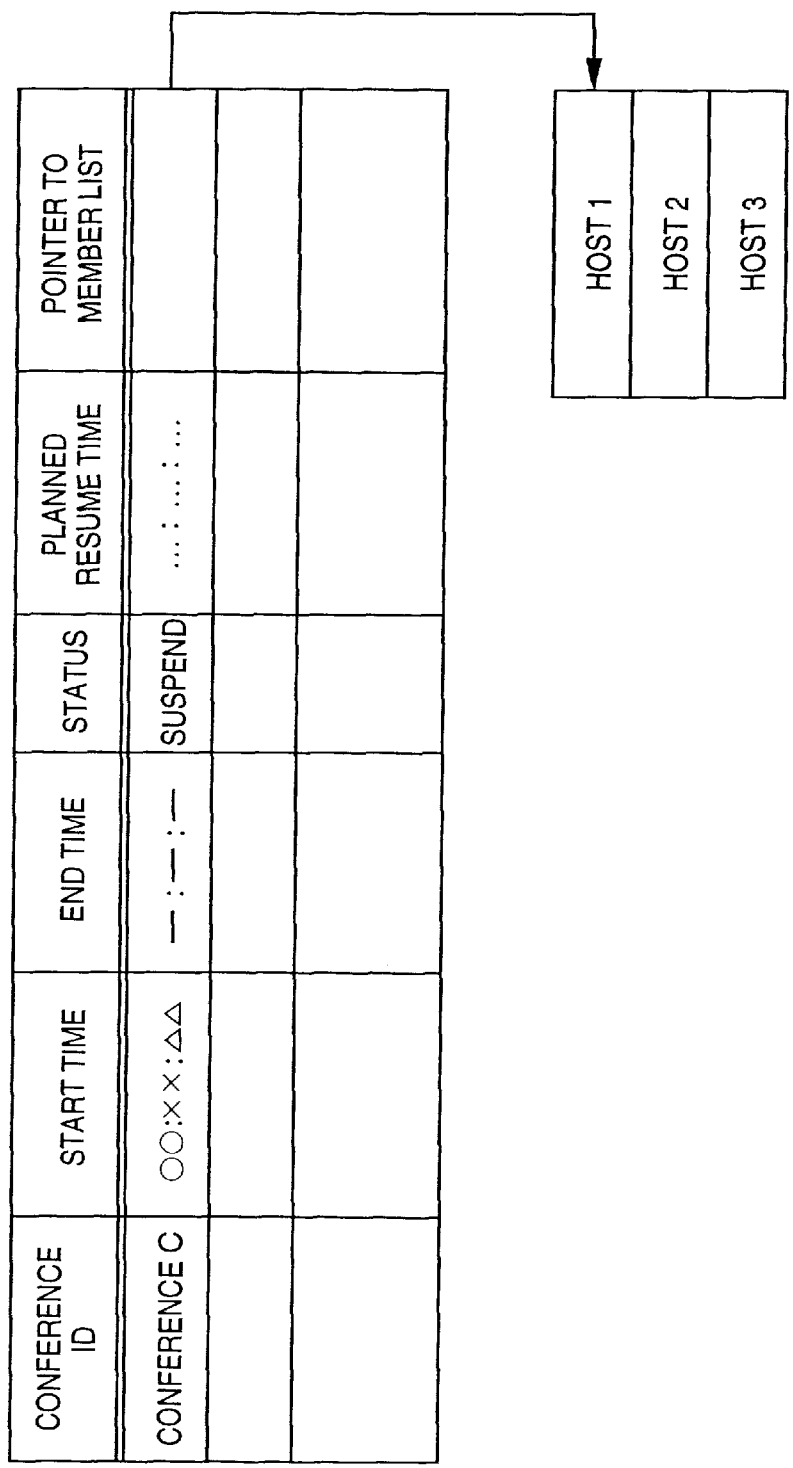
FIG. 17 shows an example of conference information.

The conference information has the contents shown in FIG. 17: the conference ID, start time, end time, status of the conference, planned resume time upon suspend of the conference, and members who take part in the conference. Such information is stored in the conference information storage module 72 in the second system 31, and is displayed, as shown in FIG. 16, as needed. The operator refers to the conference information on the basis of a conference list 100 displayed initially. Since a plurality of TV conferences are often in session on the network, first systems as many as the number of TV conferences are present, and all these first systems are connected to the second system (running on the terminal A0) via the network. The conference list 100 is a list of conferences monitored by the first systems.

Figure 14:
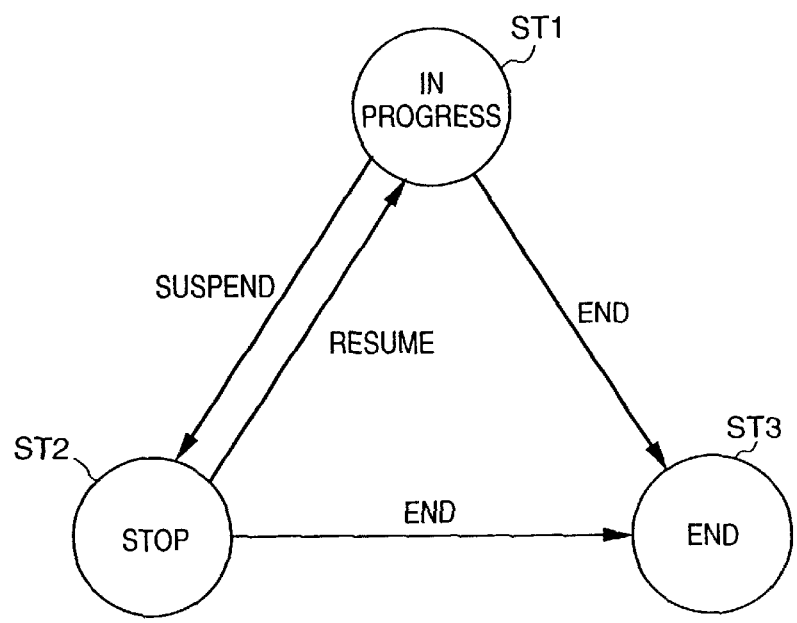
FIG. 14 shows transition of the state of a conference.

In FIG. 16, the conference list 100 is a list of conferences which are meeting, and "end", "in progress", and "suspend" respectively represent the status of conference at the referred timing. The status of conference includes three states, i.e., "in progress" ST1, "stop" ST2, and "end" ST3, which make status transition, as shown in FIG. 14. The conference status transits by exchanging conference information change messages (to be described later). The conference list 100 is formed as a hypertext that links desired words and sentences, and the conference names (conferences A, B, and C in FIG. 16) in the list have links to pages for displaying the corresponding conference information. For example, when a predetermined operation such as double clicking or the like is done on the column of conference C, information at the destination of the link is read out, and conference information 101 of conference C is displayed. The conference information 101 includes a list of members who are the members of the conference, start and end times (the end time is blank for the conference in progress) of the conference, a link to the conference record, a link to a comment on the conference, and a link to a middle-joining request message generation page.

When the conference record is selected on the conference information 101, a conference record list 102 appears. In the conference record list 102, conference records are listed in the order of their recorded times and have text, audio and image links. When a text link is selected, text information of the corresponding conference record is displayed; when an audio link is selected, audio information of the corresponding conference record is output. Also, when an image link is selected, a screen hard copy of the video conference system is displayed. A comment can be additionally overwritten on this image. Since overwriting on an image can be easily implemented using an existing drawing tool technique with a multilayer structure, a detailed description thereof will be omitted.

Figure 5:
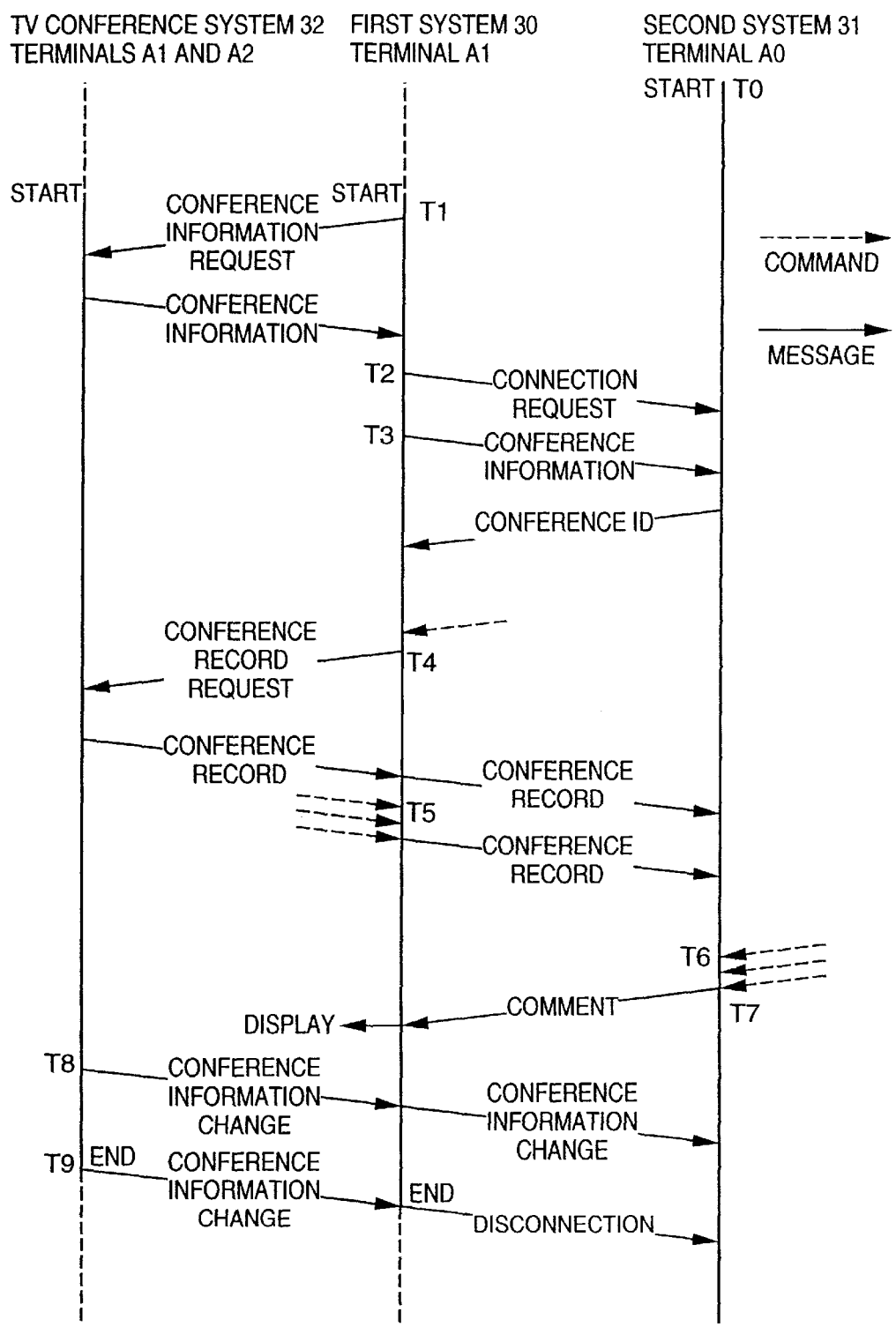
FIG. 5 is a chart showing the operation sequence of the system in the embodiment of the present invention.

The image overwritten with the comment is transmitted to the first system 30 as a comment message (timing T7 in FIG. 5). Upon reception of the comment message, the first system 30 displays its contents (the image added with the comment) on the screen.

When the middle-joining request link is selected on the conference information 101 in FIG. 16, a text input page 103 appears, and the user writes and transmits a message indicating his or her wish to join the conference. This message is displayed on the screen of the terminal A1 on which the first system is running in the same manner as the above-mentioned comment message. Since the subsequent middle-joining process to the video conference system is implemented using the function of the video conference system, and falls outside the scope of the conference management system according to the present invention, a detailed description thereof will be omitted.

When the conference information has changed, e.g., when one of members has left the conference, the video conference system 32 on the terminal A1 transmits a conference information change message to the first system 30 (timing T8 in FIG. 5). In this embodiment, the video conference system 32 transmits the conference information change message. If the video conference system does not have such function, the user informs the first system of changes in conference information. This is realized by a command input. The conference information change message is transmitted every time the conference information has changed. Upon reception of the conference information change message, the first system 30 transmits its content as a conference information change message to the second system. Upon receiving the conference information change message, the second system 31 changes the conference information stored in the storage module 72 on the basis of the received contents.

When the contents of the conference information change message indicate the end of the conference (timing T9 in FIG. 5), the first system 30 that received the message with such contents disconnects the connection to the second system 31 and ends its processing. Upon detection of the disconnection, the second system 31 changes the conference status to "end".

Processing Sequence by First System

The individual processing operations of the conference management in this embodiment will be described below with reference to the drawings. The processing to be described below will exemplify a case in the system shown in FIG. 3. The flow chart to be described below describes the processing sequence executed by the first system 30, and can also be implemented by executing a program stored in the RAM 22 by the CPU 20 in the terminal. In this case, the program that describes the sequence in FIG. 6 is loaded onto the RAM 22 by reading out a program file from the external storage device 23 such as an FDD or the like.

Figure 6:
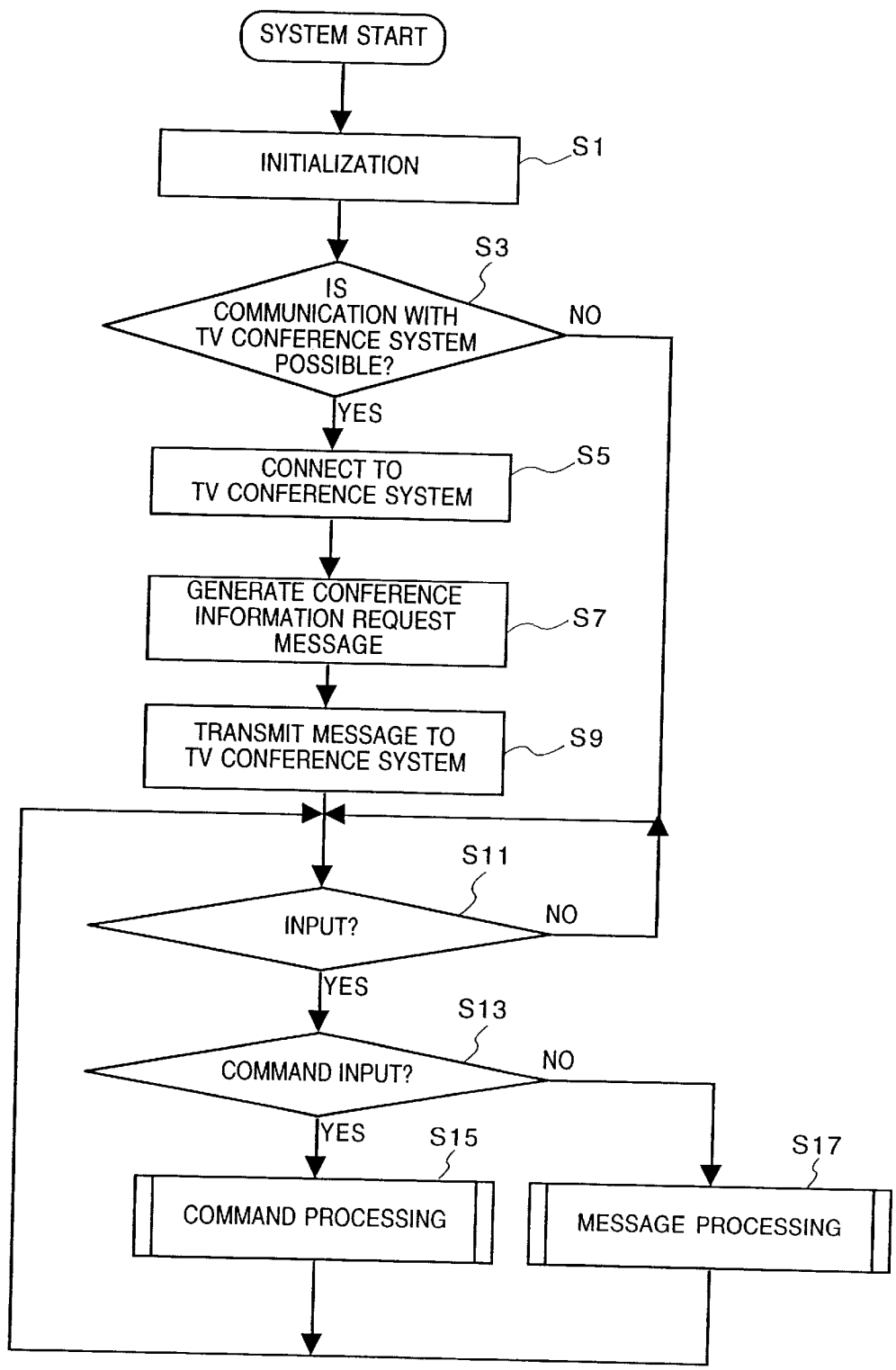
FIG. 6 is a flow chart showing the flow of main loop processing of the first system in the embodiment of the present invention.

FIG. 6 is a flow chart showing the flow of processing since the first system 30 is started.

When the first system 30 is started, variables and the like used in the system (the modules 50 to 58 in FIG. 1) are initialized in step S1. The communication module 53 checks in step S3 if the first system can communicate with the video conference system 32.

If NO in step S3, the flow skips steps S5 to S9. On the other hand, if the first system can communicate with the video conference system running on the terminals A1 and A2, the communication module 53 performs communication connection with the video conference system in step S5. The message generation module 57 generates a conference information request message in step S7, and the message transmission module 58 transmits the generated message to the video conference system 32 via the communication module 53 and the network in step S9.

The processing in steps S11 to S17 is repetitively executed, and corresponds to the main loop of the first system 30. In step S11, the communication module 53 and the command analysis module 54 detect an input to the system. If NO in step S11, step S11 is repeated. On the other hand, if YES in step S11, it is checked in step S13 if the detected input is a command input from the input device 2. If YES in step S13, the command analysis module 54 starts command processing in step S15. The processing of the respective commands will be described in detail later. On the other hand, if the detected input is a message from the second system 31 or the video conference system 32, the communication module 53 starts message reception processing in step S17. The processing of the individual messages will be described in detail below.

Message Processing

Figure 7:
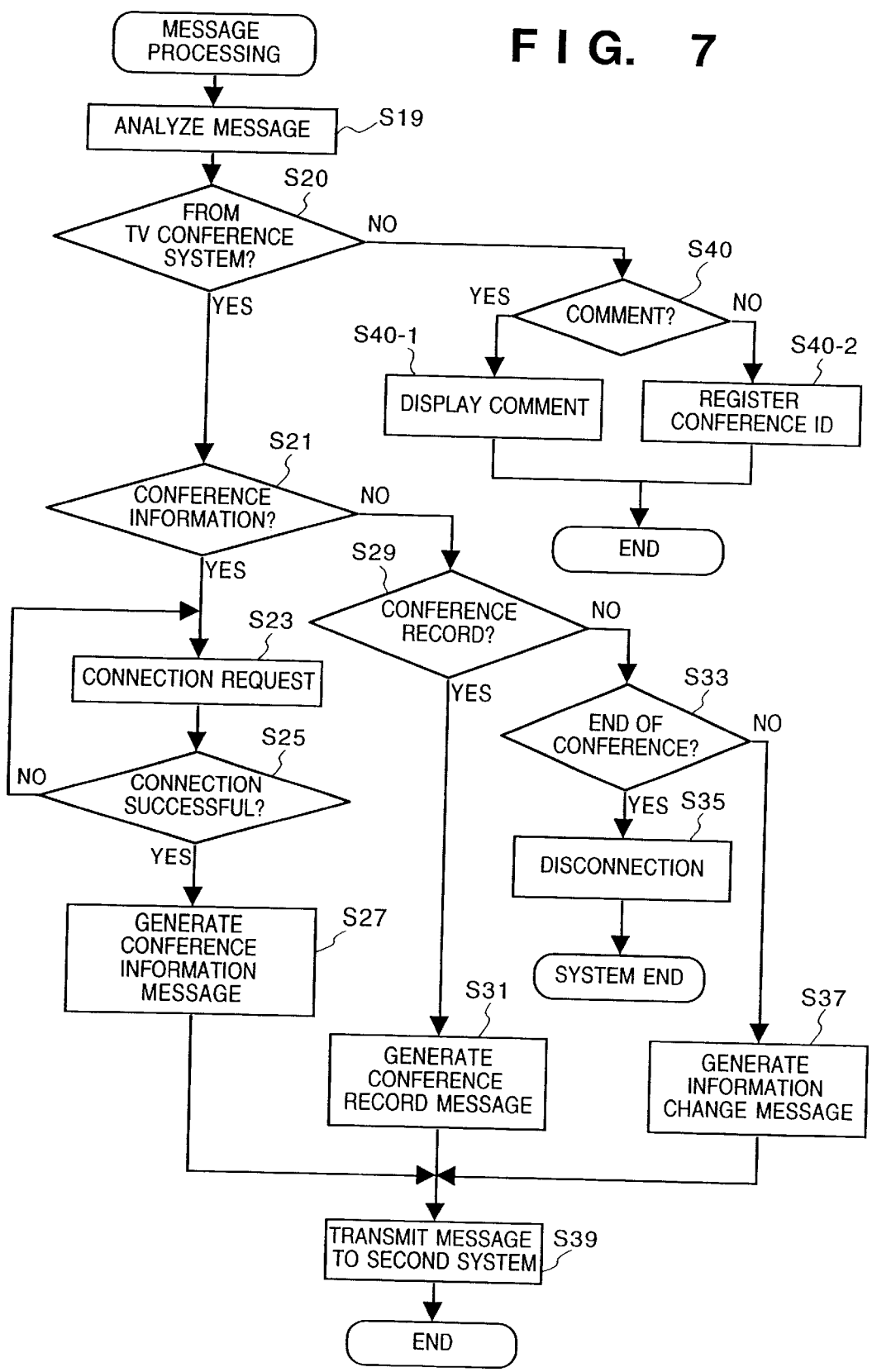
FIG. 7 is a flow chart showing the flow of processing when the first system in the embodiment of the present invention has received a message.

FIG. 7 is a flow chart showing the flow of processing when the first system 30 has received a message, and corresponds to step S17 in FIG. 6.

When the first system 30 has received a message, the message reception module 52 analyzes the type of received message in step S19. It is determined in step S20 whether the message came from the video conference system or the second system. If the message came from the video conference system, it is checked in step S21 if the analysis result in step S10 indicates a conference information message. If YES in step S21, the communication module 53 issues a connection request to the second system 31 in step S23. The connection request is repetitively issued until the connection succeeds (step S25). However, if the time elapsed or the number of repetition times exceeds a predetermined upper limit, the connection request processing may be interrupted.

If the connection succeeds, the message generation module 57 generates a conference information message on the basis of the conference information received from the video conference system in step S27. In step S39, the message transmission module 58 transmits the conference information message to the second system 31 via the communication module 53.

Figure 15:
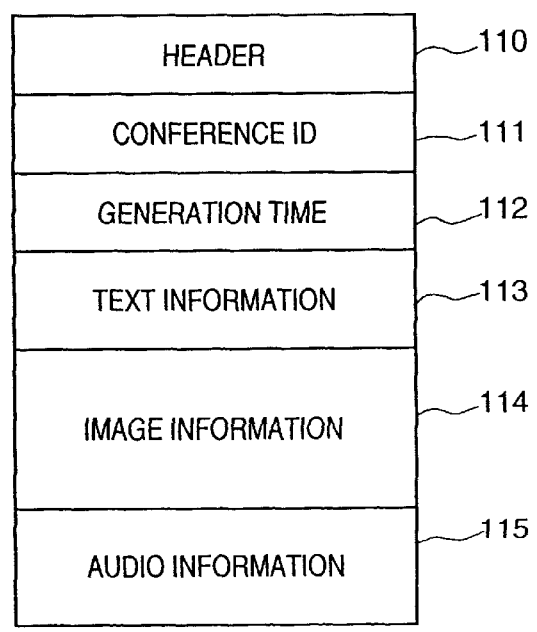
FIG. 15 shows the format of a conference record message.

If it is determined in step S21 that the analysis result does not indicate the conference information message, it is checked in step S29 if the analysis result in step S19 indicates a conference record message. If YES in step S29, a conference record message is generated on the basis of the contents of the conference record received from the video conference system 32 in step S31. The conference record message to be generated has a format shown in FIG. 15. That is, the message includes a conference ID 111, a generation time 112 of the conference record, text information 113 as the contents of the conference record, audio information 114, and image information 115 after a header 110. Note that the header 110 and the conference ID 111 are also commonly attached to messages other than the conference record message.

In step S39, the message transmission module 58 transmits the generated conference record message to the second system 31 via the communication module 53.

If it is determined in step S29 that the analysis result does not indicate the conference record message, it is checked in step S33 if the analysis result in step S19 indicates a message that informs the end of the conference. If YES in step S33, the communication module 53 disconnects the communication connection with the second system 31 in step S35. Thereafter, the first system ends its processing.

If it is determined in step S39 that the analysis result does not indicate the conference end message, it is determined that a conference information change message is received from the video conference system, and the message generation module 57 generates a conference information change message based on the contents received from the video conference system in step S37. The contents include, e.g., the suspend of the conference. In step S39, the message transmission module 58 transmits the generated conference information change message to the second system 31 via the communication module 53.

On the other hand, if it is determined in step S20 that the received message is not the one from the video conference system, it is determined that the message is received from the second system, and it is checked in step S40 if the message is a comment message. If YES in step S40, the comment message is displayed from the display module 50 (step S40-1). On the other hand, if NO in step S40, it is determined that the message is the one for informing a conference ID assigned by the second system, and the received conference ID is stored in the external storage device or RAM (step S40-2).

Command Processing

Figure 8:
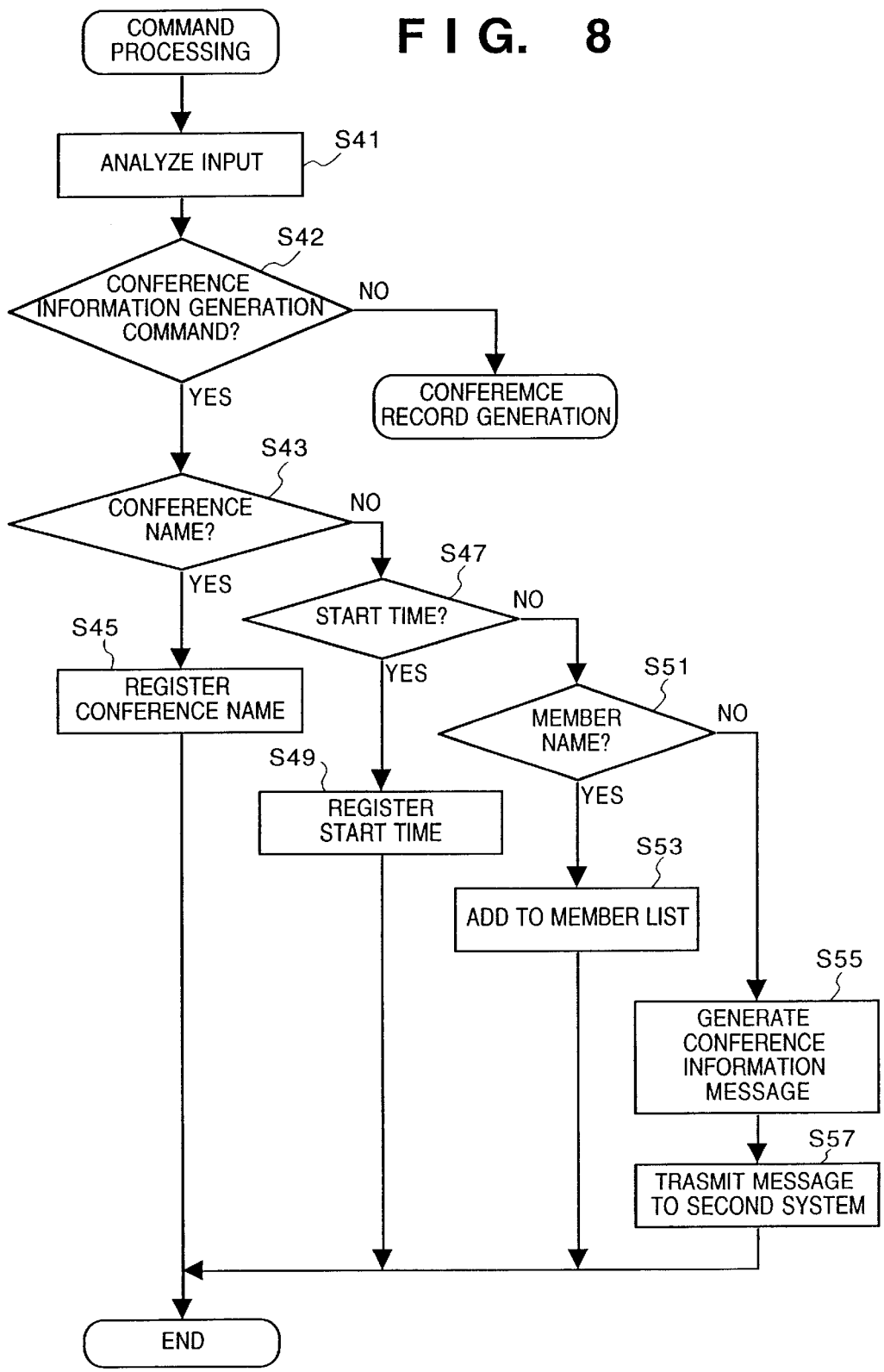
FIG. 8 is a flow chart showing the flow of processing when the first system in the embodiment of the present invention generates conference information.

FIG. 8 is a flow chart showing the flow of processing when a command is input to the first system 30, and corresponds to step S15 in FIG. 6. The commands input to the first system include a command for generating a conference information message on the basis of conference information input by the user and transmitting the generated message, and a command for generating a conference record message on the basis of information input by the user and transmitting the message, when the first system cannot communicate with the video conference system 32.

In step S41, the command analysis module 54 analyzes an input from the input device 2. It is then tested in step S42 if the input command is a conference information generation command. If YES in step S42, the command analysis module 54 checks in step S43 if the input is a conference name. If YES in step S43, the conference information acquisition module 55 stores the input conference name in the conference name storage area in the RAM 22 in step S45.

If NO in step S43, the command analysis module 54 checks in step S47 if the input indicates a start time. If YES in step S47, the conference information acquisition module 55 stores the input start time in the start time storage area in the RAM 22 in step S49.

If NO in step S47, the command analysis module 54 checks in step S51 if the input is a member name. If YES in step S51, the conference information acquisition module 55 stores the input member name in the member name storage area in the RAM 22 in step S53.

If NO in step S51, the message generation module 57 reads out a conference name, start time, and member list stored in the RAM 22 and generates a conference information message in step S55. In step S57, the message transmission module 58 transmits the generated message to the second system 31 via the communication module 53.

Figure 9:
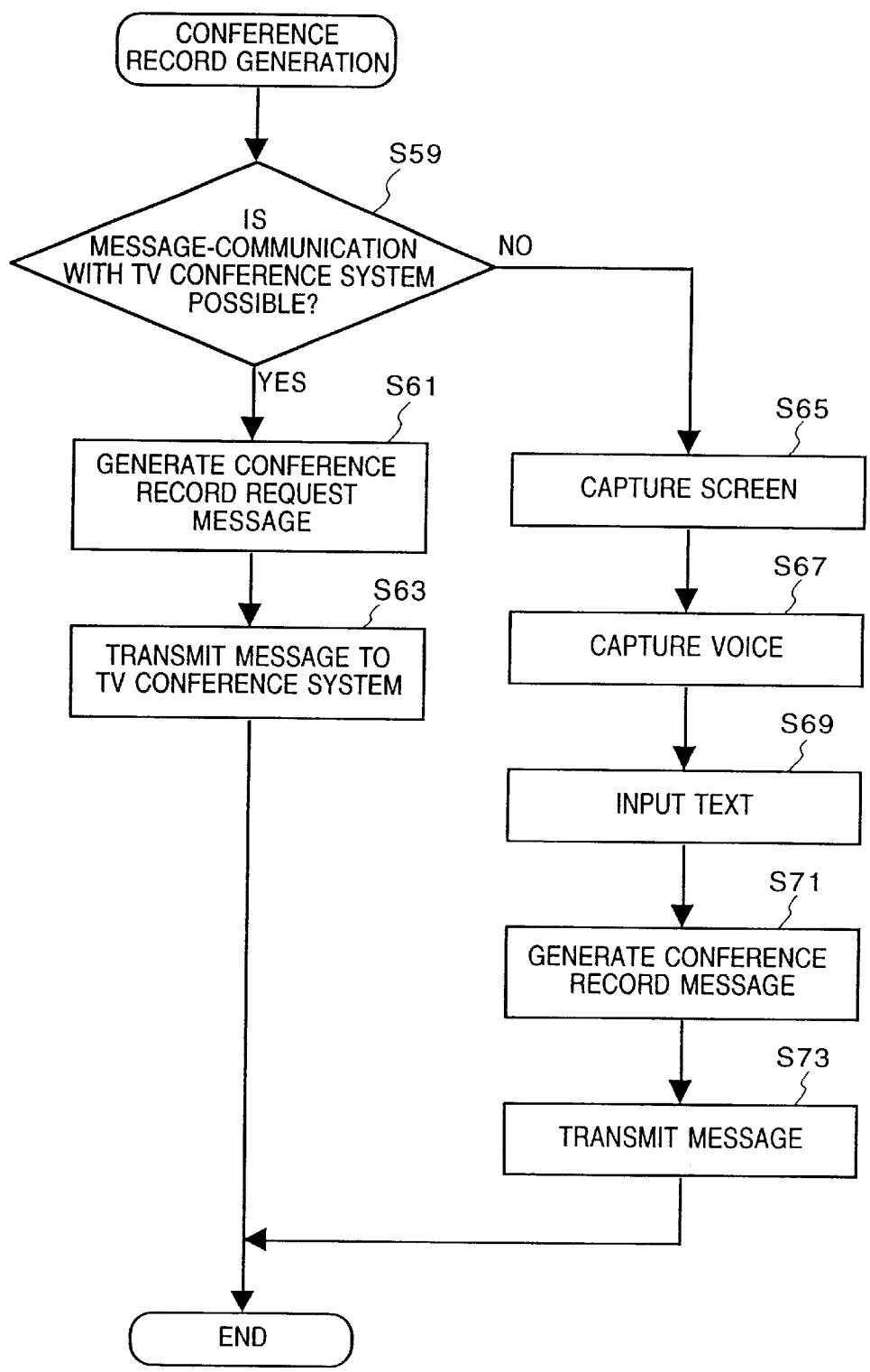
FIG. 9 is a flow chart showing the flow of processing when the first system in the embodiment of the present invention generates a conference record.

On the other hand, if the input command is not a conference information generation command, the flow branches to the conference record generation sequence shown in FIG. 9.

FIG. 9 is a flow chart showing the flow of processing for generating a conference record on the basis of input information from the user by the first system 30.

In step S59, the communication module 53 checks if the first system can communicate with the video conference system 32. If YES in step S59, the message generation module 57 generates a conference record request message in step S61. In step S63, the message transmission module 58 transmits the generated conference record request message to the video conference system 32 via the communication module 53. A response to the message transmitted at that time is processed in the sequence shown in FIG. 7, and is transmitted as a conference record message to the second system.

If it is determined in step S59 that the first system cannot communicate with the video conference system 32, the conference record generation module 56 forms a hard copy of the screen image of the terminal A1 at that time and stores that data in the image storage area in the RAM 22 in step S65.

In step S67, voice conversations exchanged on the TV conference are digitally recorded, and the data is stored in the audio data storage area of the RAM 22. The recording period is set in initialization of the first system, and can be changed later. In another method, voice conversations may be recorded since the system was started, and a group of conversations around the generation time of the conference record may be stored.

In step S69, the conference record generation module 56 generates additional information for the conference record on the basis of an input by the user, and stores the data in the conference additional information storage area in the RAM 22.

In step S71, the message generation module 57 reads out the screen image data, audio data, and additional information from the RAM 22, and generates a conference record message. In step S73, the message transmission module 58 transmits the generated conference record message to the second system 31 via the communication module 53.

Processing Sequence by Second System

Figure 10:
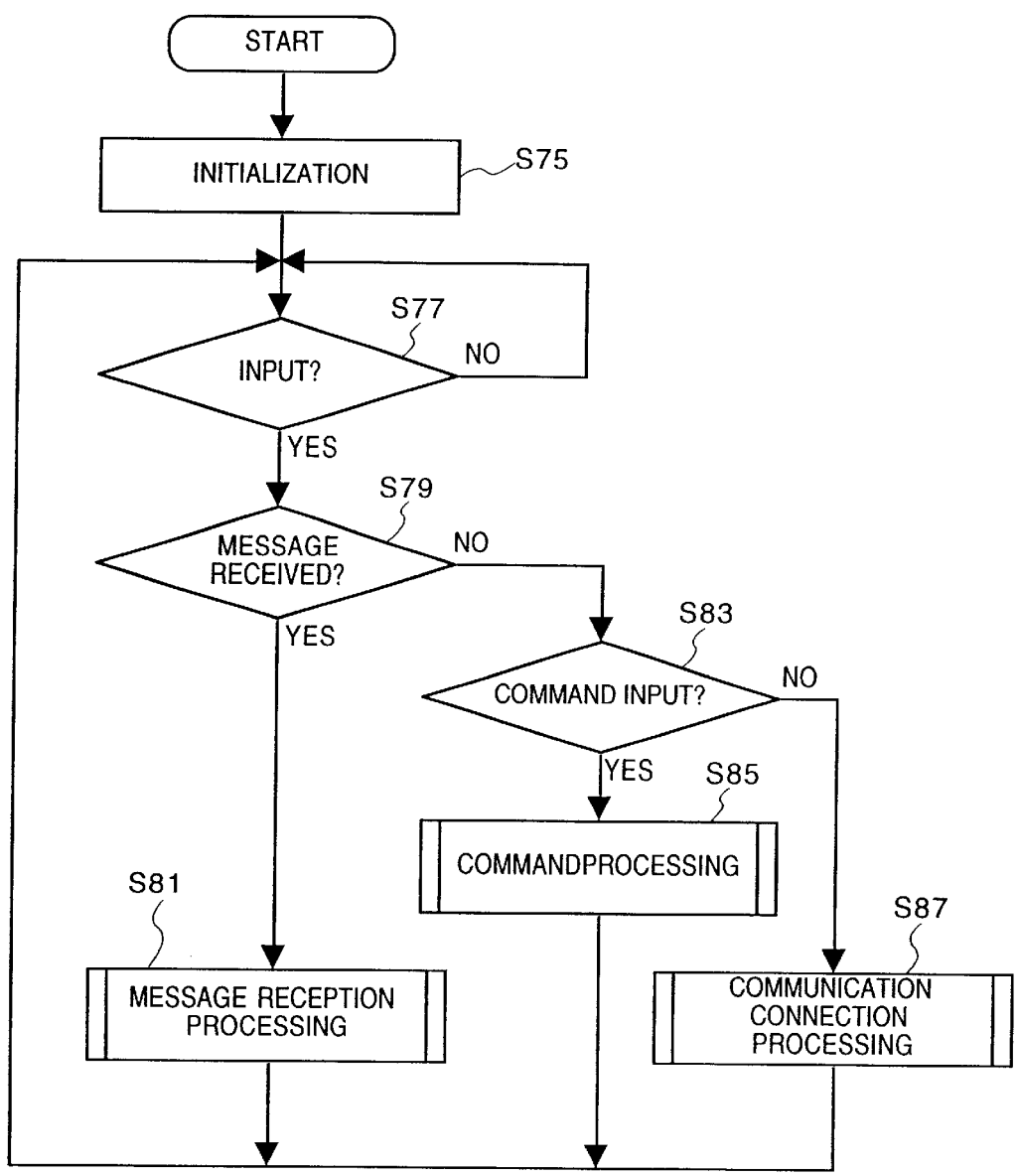
FIG. 10 is a flow chart showing the flow of main loop processing of the second system in the embodiment of the present invention.

FIG. 10 is a flow chart showing the flow of processing since the second system 31 is started. This sequence is executed by the second system shown in FIG. 2, but may be implemented by executing a program in the RAM 22 by the CPU 20. In this case, the program that describes the sequence shown in FIG. 10 is loaded onto the RAM 22 from a program file supplied from, e.g., the FDD 23, and is executed.

When the second system 31 is started, variables and the like used in the system are initialized in step S75. Since steps S77 to S87 are repeated, they form the main loop of the second system 31. In step S77, the communication module 76 and the command analysis module 77 detect any input. Note that the input includes a message from the first system 30 or a user's input from the input device 2. If no input is detected, step S77 is repeated.

If an input is detected in step S77, the communication module 76 checks in step S79 if that input is a message coming from the first system 30. If YES in step S79, the message reception module 75 executes message reception processing in step S81.

If it is determined in step S79 that the input is not a message, the command analysis module 77 checks in step S83 if the input is a command input from the input device 2. If YES in step S83, the command analysis module 77 executes command processing in step S85.

On the other hand, if it is determined in step S83 that the input is not a command input, the communication module 76 performs communication connection processing with the first system 30 in step S87.

Communication Connection Processing

Figure 11:
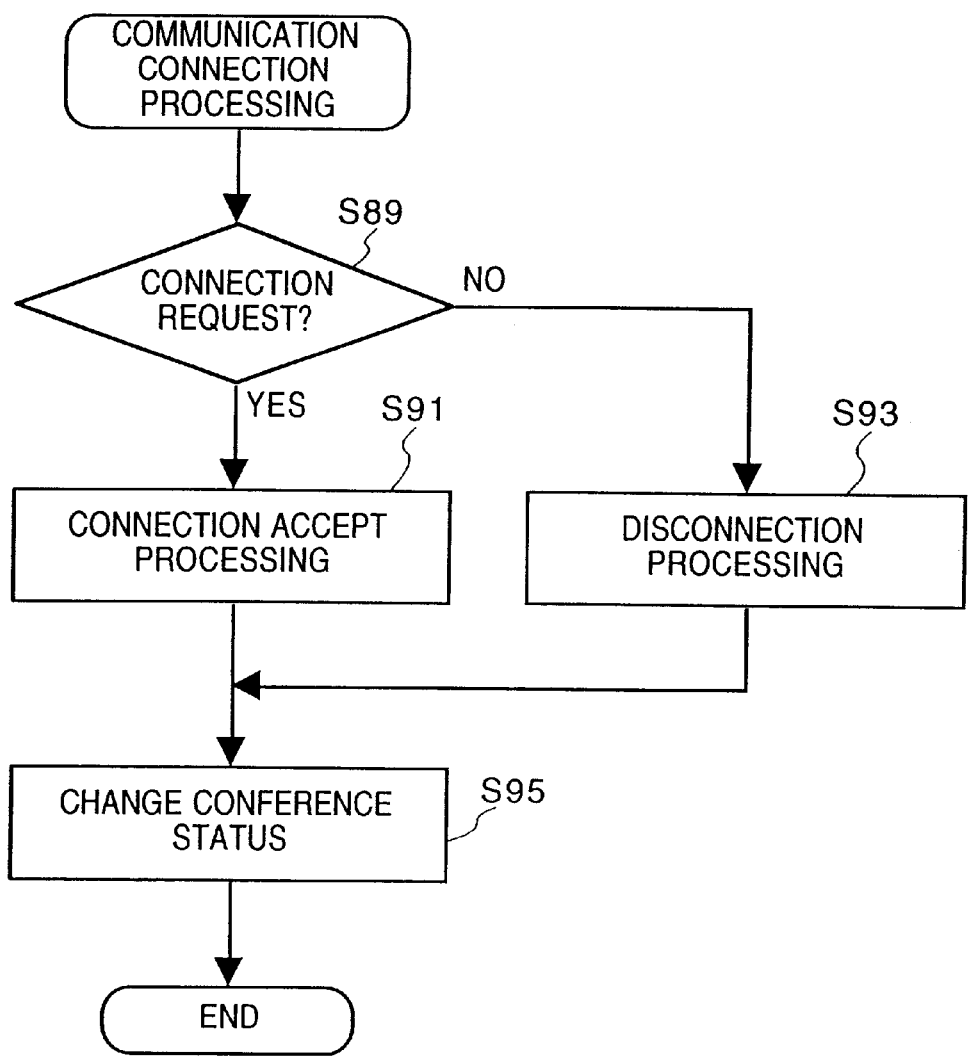
FIG. 11 is a flow chart showing the flow of processing when the second system in the embodiment of the present invention performs communication connection.

FIG. 11 is a flow chart showing the flow of the communication connection processing with the first system 30 in step S87 in FIG. 10.

When the second system 31 has received an input associated with a communication connection from the first system 30, the communication module 76 checks in step S89 if the input is a connection request. If YES in step S89, the communication module 76 executes processing for accepting that connection request in step S91. In step S95, the status of the conference managed by the second system 31 is changed. If the conference corresponding to the connection request is a new one, a conference information storage area is assured on the RAM 22 to store conference information to be received later, thus preparing for conference registration. In this case, the conference status is set to be "in progress". On the other hand, if the connection request corresponds to a conference that was held previously, the conference status information in the conference information storage area is changed to "resume". The video conference system or an operator's command informs the conference management system that the conference was held previously. In this case, the conference management system is informed of the conference ID, and checks based on a value sp if the conference is a new or resumed one. On the other hand, if it is determined in step S89 that the input is not a connection request, since it is determined that the request is a disconnection request, the communication module 76 executes disconnection processing in step S93. In step S95, the conference status is changed to "end".

Message Reception Processing

Figure 12:
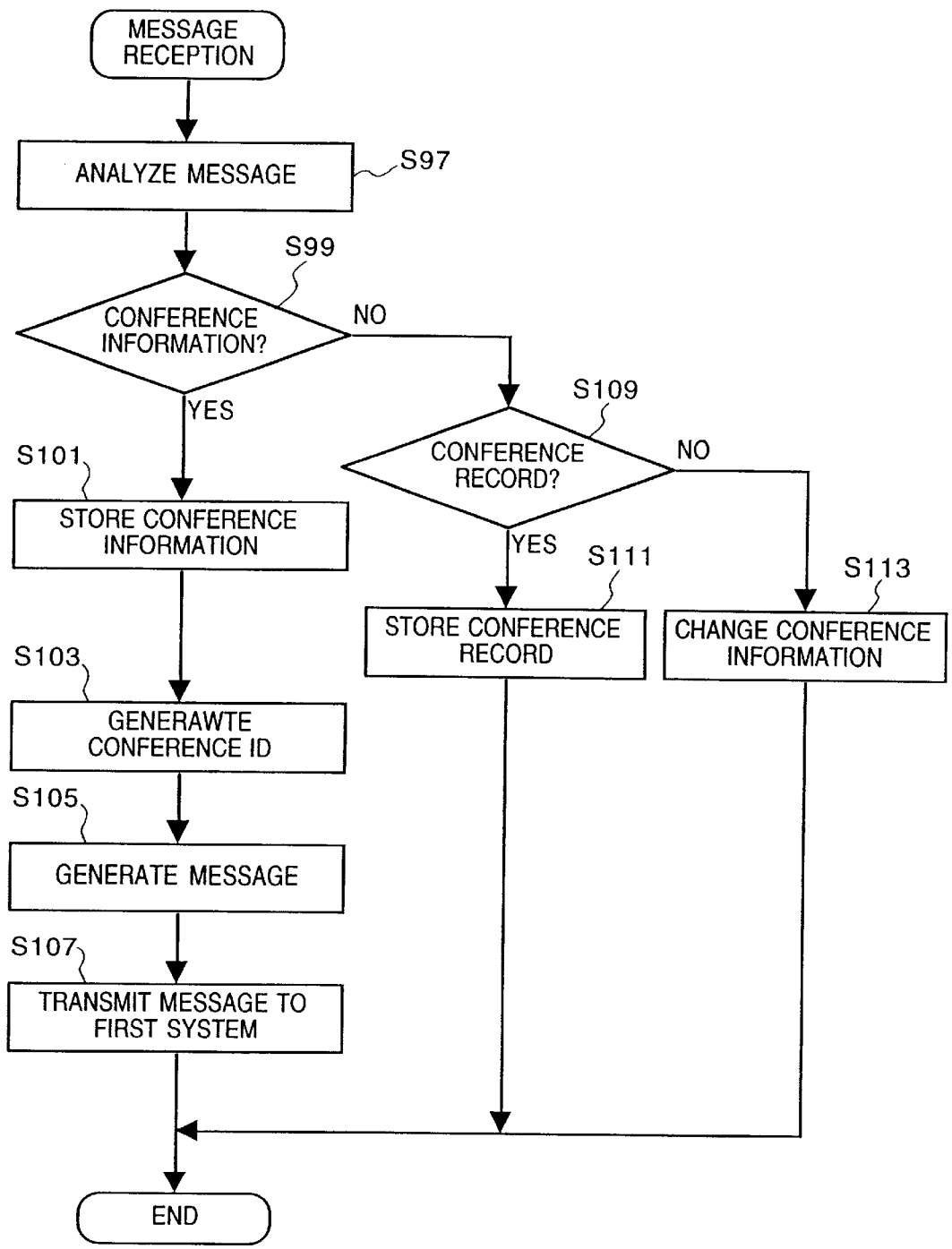
FIG. 12 is a flow chart showing the flow of processing when the second system in the embodiment of the present invention has received a message.

FIG. 12 is a flow chart showing the flow of processing in step S81 in FIG. 10 when the second system 31 has received a message.

When the message reception module 75 of the second system 31 has received a message from the first system 30 via the communication module 76, the message analysis module 74 analyzes the received message in step S97.

The message analysis module 74 then checks in step S99 if the message informs conference information. If YES in step S99, the message analysis module 74 stores the received conference information in the conference information storage area in the RAM 22 in step S101. In step S103, the message analysis module 74 generates a conference ID, and stores it in the storage module 72 for storing the conference information.

In step S105, the message generation module 79 generates a message for informing the first system 30 of the generated conference ID. In this case, the conference ID is obtained by reading out the ID generated in step S103 from the conference information storage module 72. In step S107, the message transmission module 80 transmits the generated message to the first system 30 via the communication module 76.

If it is determined in step S99 that the analysis result does not indicate conference information, the message analysis module 74 checks in step S109 if the received message is a conference record message. If YES in step S109, the message analysis module 74 stores the conference record in the conference record storage module 73 in step S111.

However, if NO in step S109, since it is determined that the received message is a conference information change message, the message analysis module 74 changes the conference information stored in the conference information storage module 72 in step S113.

Figure 13:
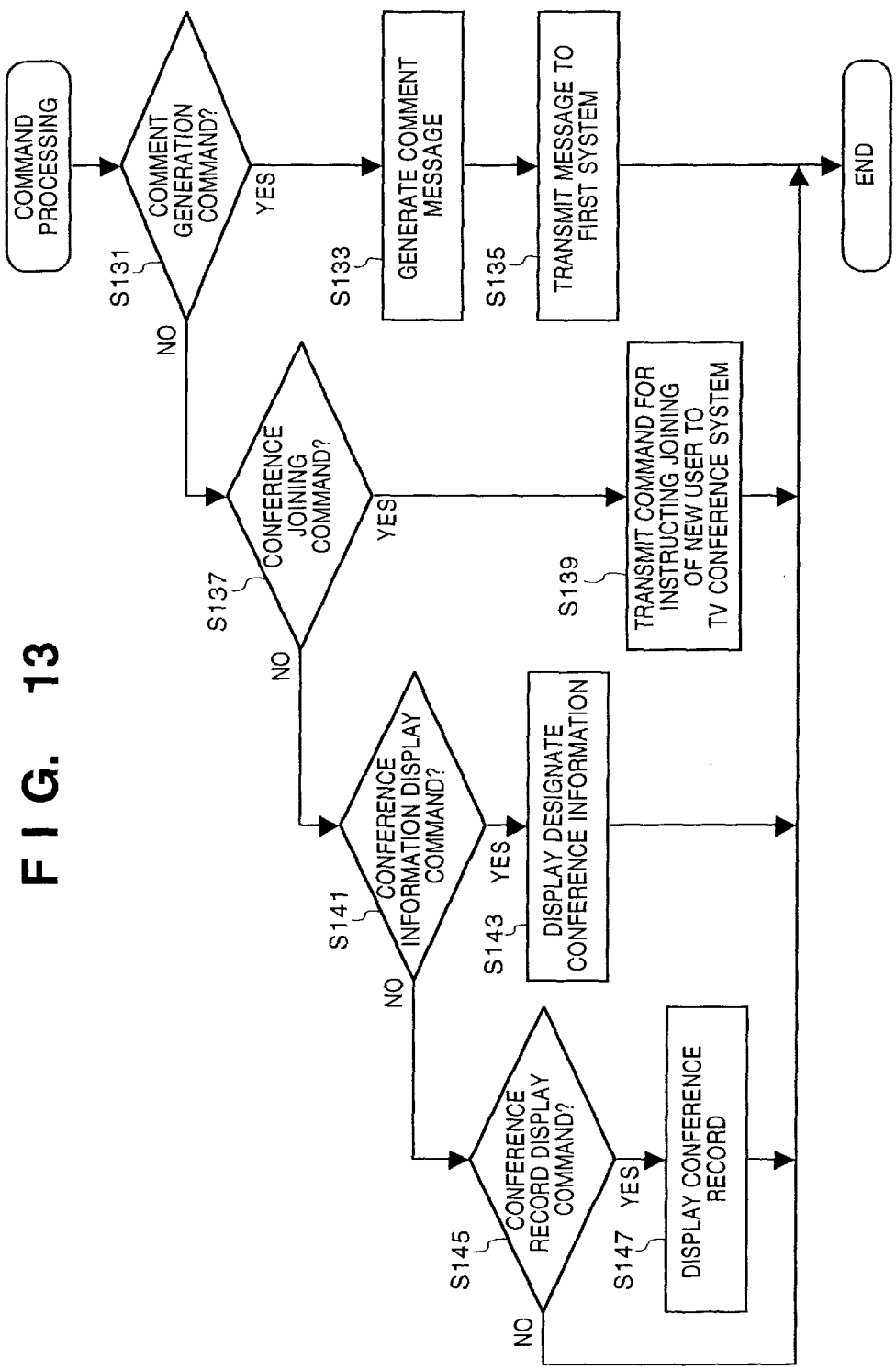
FIG. 13 is a flow chart showing the sequence of command processing by the second system in the embodiment of the present invention.

FIG. 13 is a flow chart showing the sequence of the input command processing by the operator in step S85 in FIG. 10.

It is checked in step S131 if the input command is a comment generation command. If YES in step S131, a comment overwritten on the image is converted into a message format in step S133. In step S135, the converted message is transmitted to the first system. In this case, if a plurality of conferences are monitored, the conference ID is designated.

If the input command is not a comment generation command, it is checked in step S137 if the input command is a middle-joining command to the conference. If YES in step S137, a command that instructs joining of a new user is transmitted to the video conference system (step S139). Thereafter, since the joining procedure to the conference is executed by the video conference system, a detailed description thereof will be omitted.

If the input command is not a joining command to the conference, it is checked in step S141 if the input command is a conference information display request command. If YES in step S141, the designated conference information is read out from the storage module 72, and is displayed in step S143.

If the input command is not a conference information display request command, it is checked in step S145 if the input command is a conference record display request command. If YES in step S145, the designated conference record is read out from the storage module 73, and is displayed in step S147.

Since the above-mentioned systems can implement the function of registering a conference and managing the conference status, the function of acquiring and displaying a conference record, the message transmission function to the conference, the comment generation function on the conference record, and the middle-joining function to the conference, the operability in conference management can be improved. That is, at the terminal on which the second system is running, the status and conference record of the conference that is in progress on the terminal on which the first system is running can be referred to. On the other hand, the terminal on which the first system is running can send a comment to the conference and allows the user to join the conference from the middle. For this reason, the contents of a plurality of independent conferences can be referred to.

Since the conference information such as the conference ID, conference status, participating member list, and the like is held, a conference before suspend can be linked to that after it has resumed, even for a conference which repetitively suspends and resumes. Since the system history such as a conference record is generated to include a hard copy of the screen image, audio data that can be acquired from the terminal, and text data input by the user, the contents can be recognized quickly, and the conference can proceed efficiently. As another embodiment of the conference management system, the first system 30 can be easily built in the video conference system 32. In this case, the conference information and conference record obtained using communications can be directly extracted from internal data without using any communications. Upon implementing the system of such embodiment, the functions implemented by the first system 30 may be offered as library modules.

Second Embodiment

Figure 18:
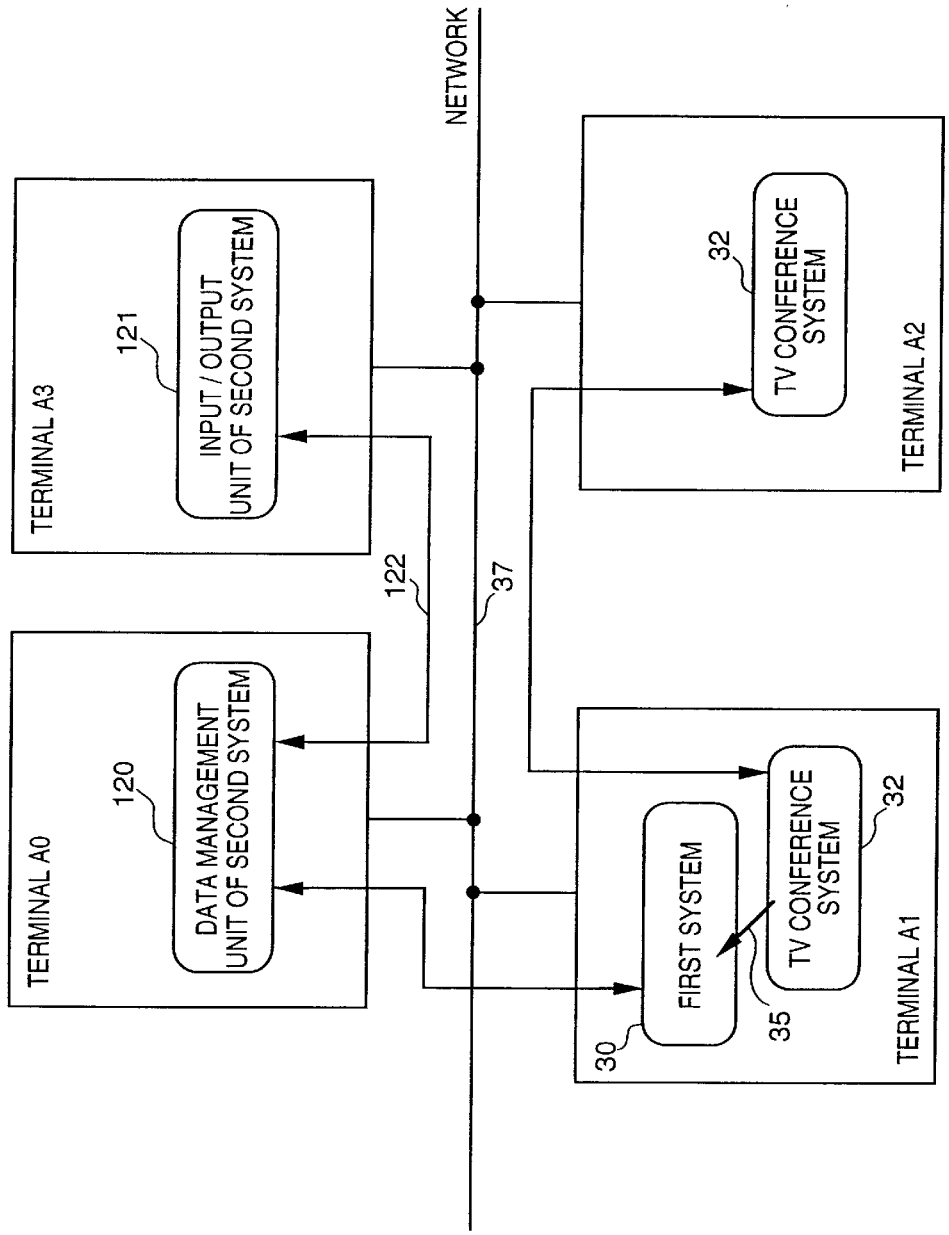
FIG. 18 is a block diagram showing another embodiment of the present invention.
Figure 22A:
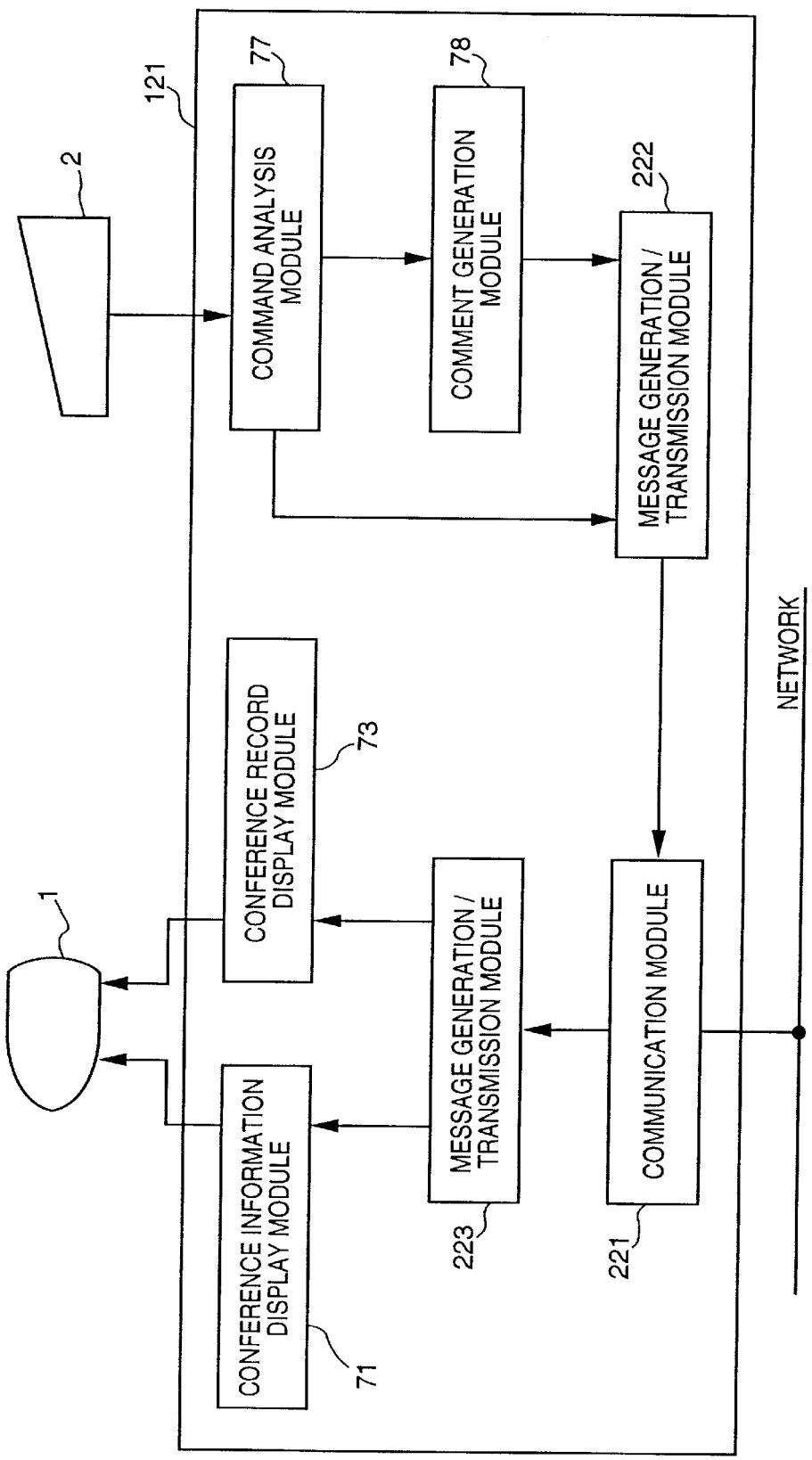
FIGS. 22A and 22B are block diagrams of a second system in the second embodiment.

As another embodiment of the conference management system, the arrangement shown in FIG. 18 may be used. In this embodiment, an input/output unit 121 in a second system 31 is independently arranged, and communicates with a data management unit 120 in the second system. FIG. 22A is a block diagram showing the input/output unit 121 of the second system. The input/output unit 121 comprises a conference record display module 70, a conference information display module 71, a command analysis module 77, a comment generation module 78, a message reception/analysis module 223 for receiving a message from the data management unit 120 of the second system and analyzing the received message, a message generation/transmission module 222 for generating a message, and transmitting the generated message to the management unit 120, and a communication module 221 for communicating with the network.

Figure 22B:
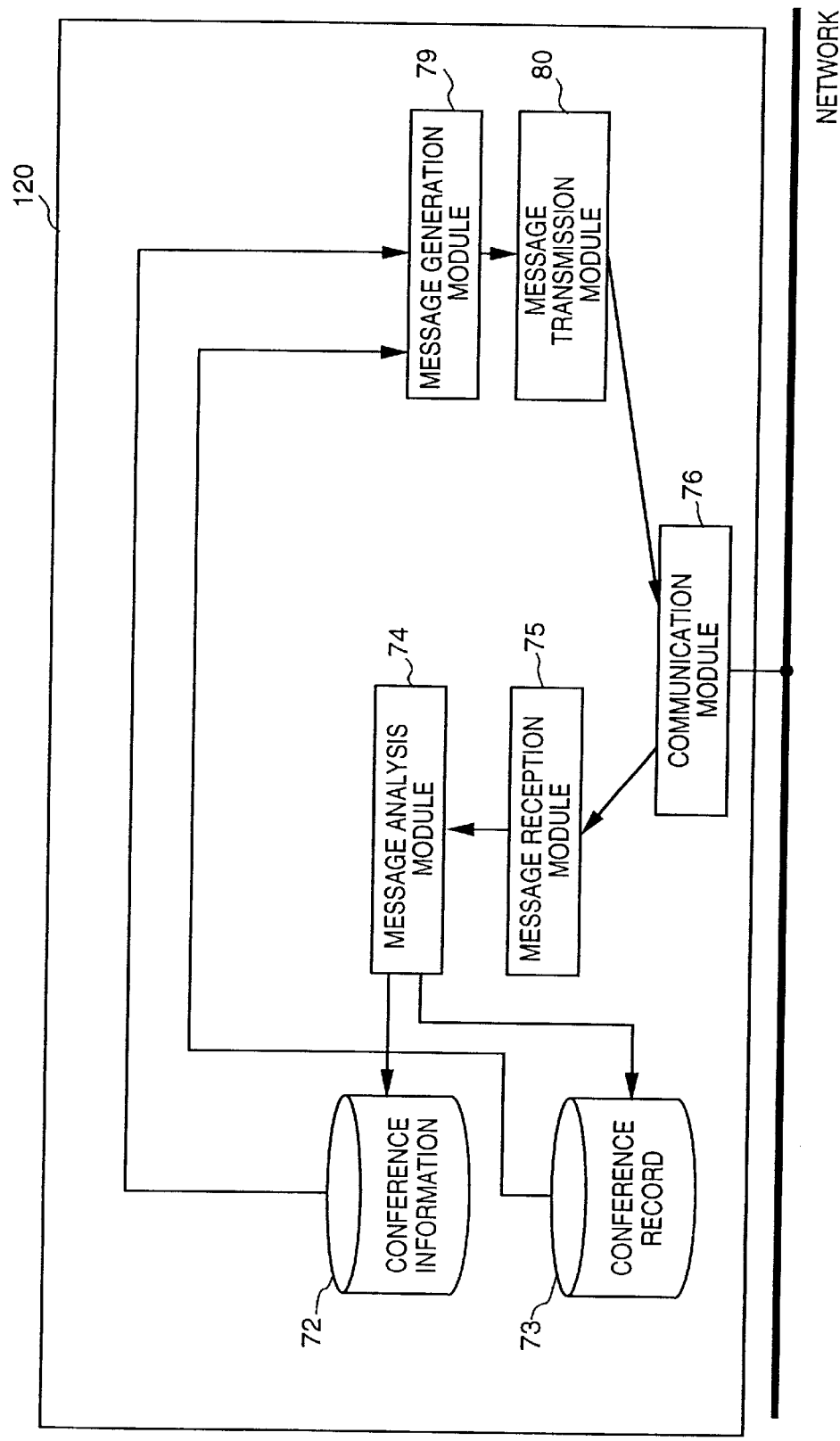
Figure 23:
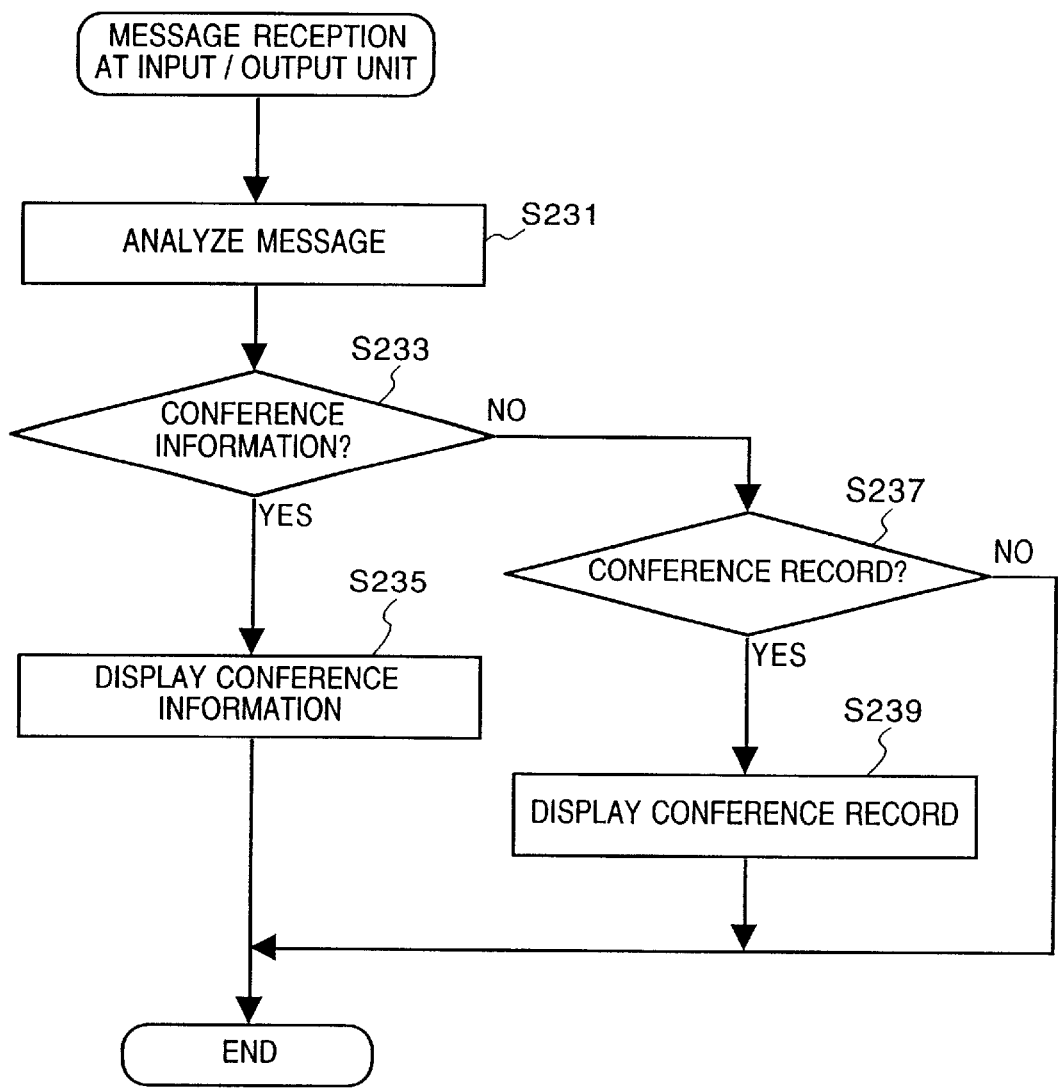
FIG. 23 is a flow chart of the message processing by an input/output unit of the second system in the second embodiment.
Figure 24:
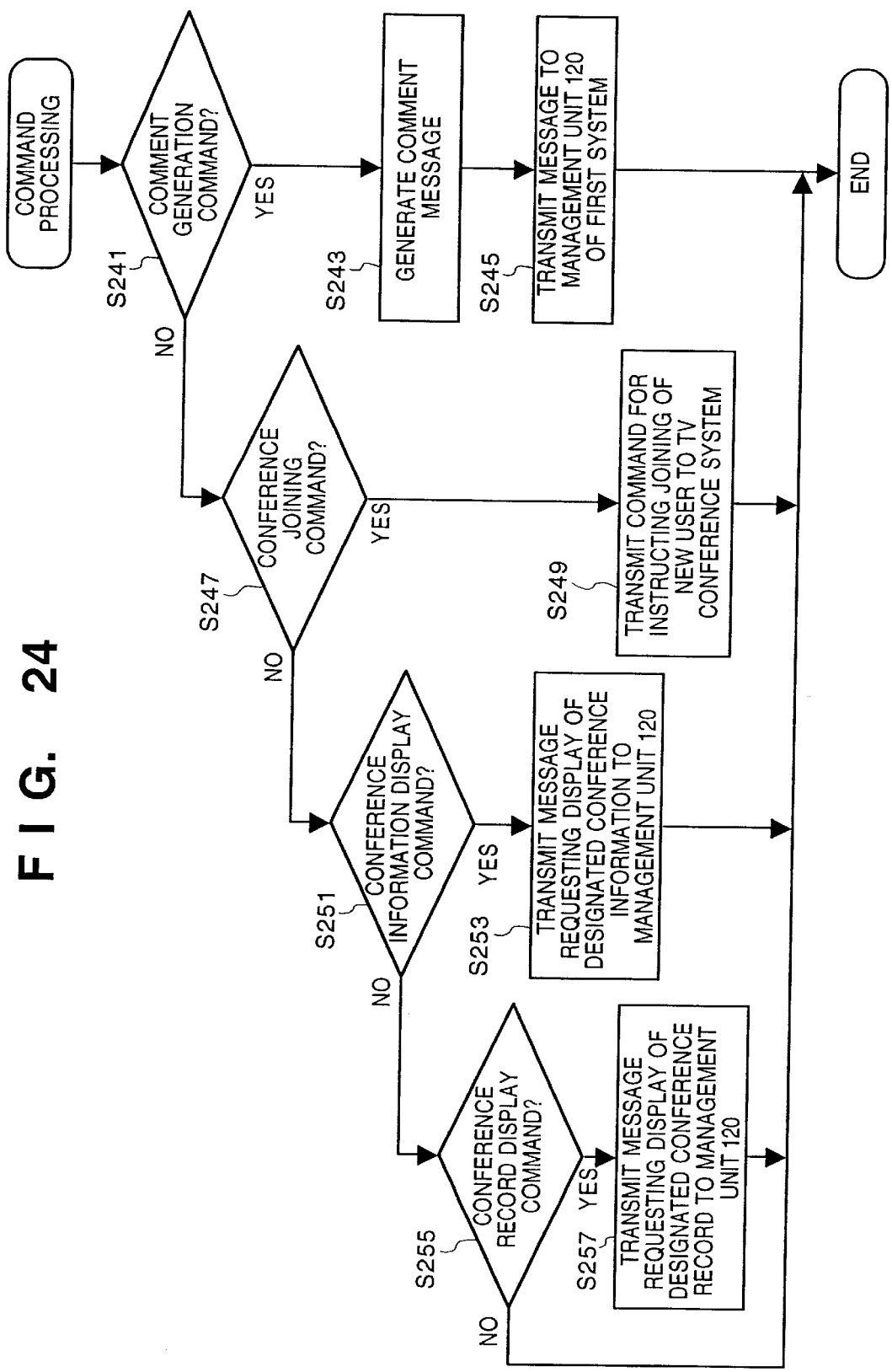
FIG. 24 is a flow chart of the command processing by the input/output unit of the second system in the second embodiment.

FIG. 22B is a block diagram showing the data management unit 120 of the second system. In the arrangement of the management unit 120, the conference record display module 70, conference information display module 71, command analysis module 77, and comment generation module 78 are excluded from the arrangement of the second system of the first embodiment. The management unit 120 neither receives inputs from the input device nor displays data on the display. All input/output processes are done via communication messages. FIGS. 23 and 24 are flow charts showing the processing sequence of the input/output unit 121 of the second system. Since the sequence after the input/output unit 121 is started is the same as that in FIG. 10, a detailed description thereof will be omitted. Also, although the communication connection processing has substantially the same contents, the other party is the management unit 120 of the second system.

FIG. 23 shows the sequence of the message reception processing in the input/output unit 121 of the second system. A message is analyzed in step S231, and it is then checked in step S233 if the received message is a conference information message from the management unit 120. If YES in step S233, the conference information is displayed in step S235.

On the other hand, if NO in step S233, it is checked in step S237 if the received information is conference record information. If YES in step S237, the conference record is displayed in step S239.

FIG. 24 shows the sequence of the command sequence in the input/output unit 121 of the second system. In step S241, it is checked if the command is a comment generation command. If YES in step S241, a comment overwritten on the image is converted into a message format in step S243. In step S245, the converted message is transmitted to the management unit 120 of the first system. In this case, when a plurality of conferences are monitored, the conference ID is designated.

If the command is not a comment generation command, it is checked in step S247 if the command is a middle-joining command to the conference. If YES in step S247, a command for instructing joining of a new user is sent to the video conference system (step S249). Thereafter, since the joining procedure to the conference is executed by the video conference system, a detailed description thereof will be omitted.

If the command is not a joining command to the conference, it is checked in step S251 if the command is a conference information display request command. If YES in step S251, a message for requesting the designated conference information is generated and transmitted to the management unit 120 of the second system in step S253.

If the command is not a conference information display request command, it is checked in step S255 if the command is a conference record display request command. If YES in step S255, a message for requesting the designated conference record is generated and transmitted to the management unit 120 of the second system in step S257.

Figure 25:
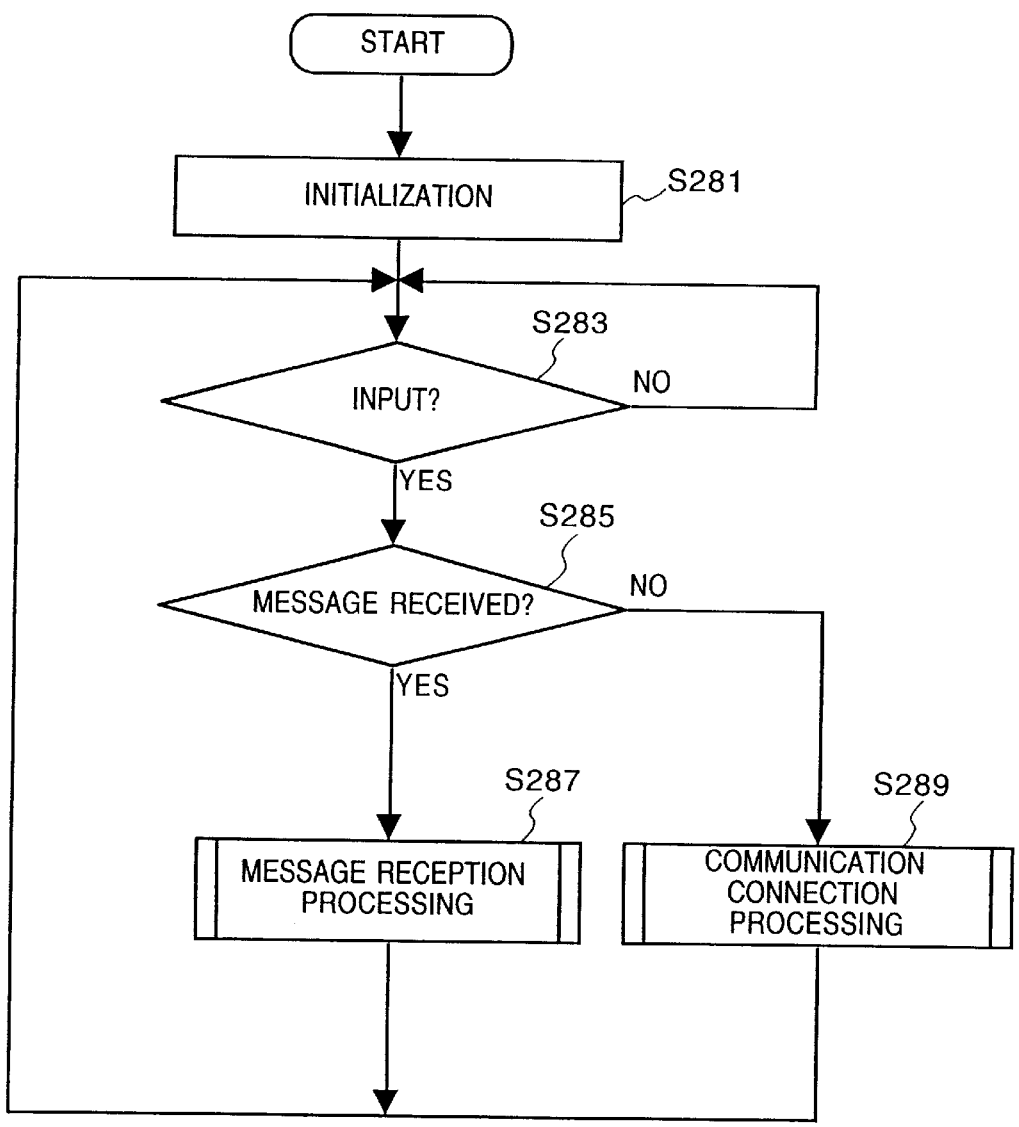
FIG. 25 is a flow chart of the main loop processing by a management unit of the second system in the second embodiment.

FIG. 25 shows the processing sequence upon starting in the management unit 120 of the second system. When the management unit 120 of the second system is started, variables and the like used in the system are initialized in step S281. In step S283, the communication module 76 detects any input. If no input is detected, step S283 is repeated.

If an input is detected in step S283, the communication module 76 checks in step S285 if that input is a message coming from the first system 30 or the input/output unit 121. If YES in step S285, the message reception module 75 executes message reception processing in step S287.

If it is determined in step S285 that the input is not a message, the communication module 76 executes communication connection processing with the first system 30 in step S289. This sequence is as has been described above with reference to FIG. 11.

Figure 26:
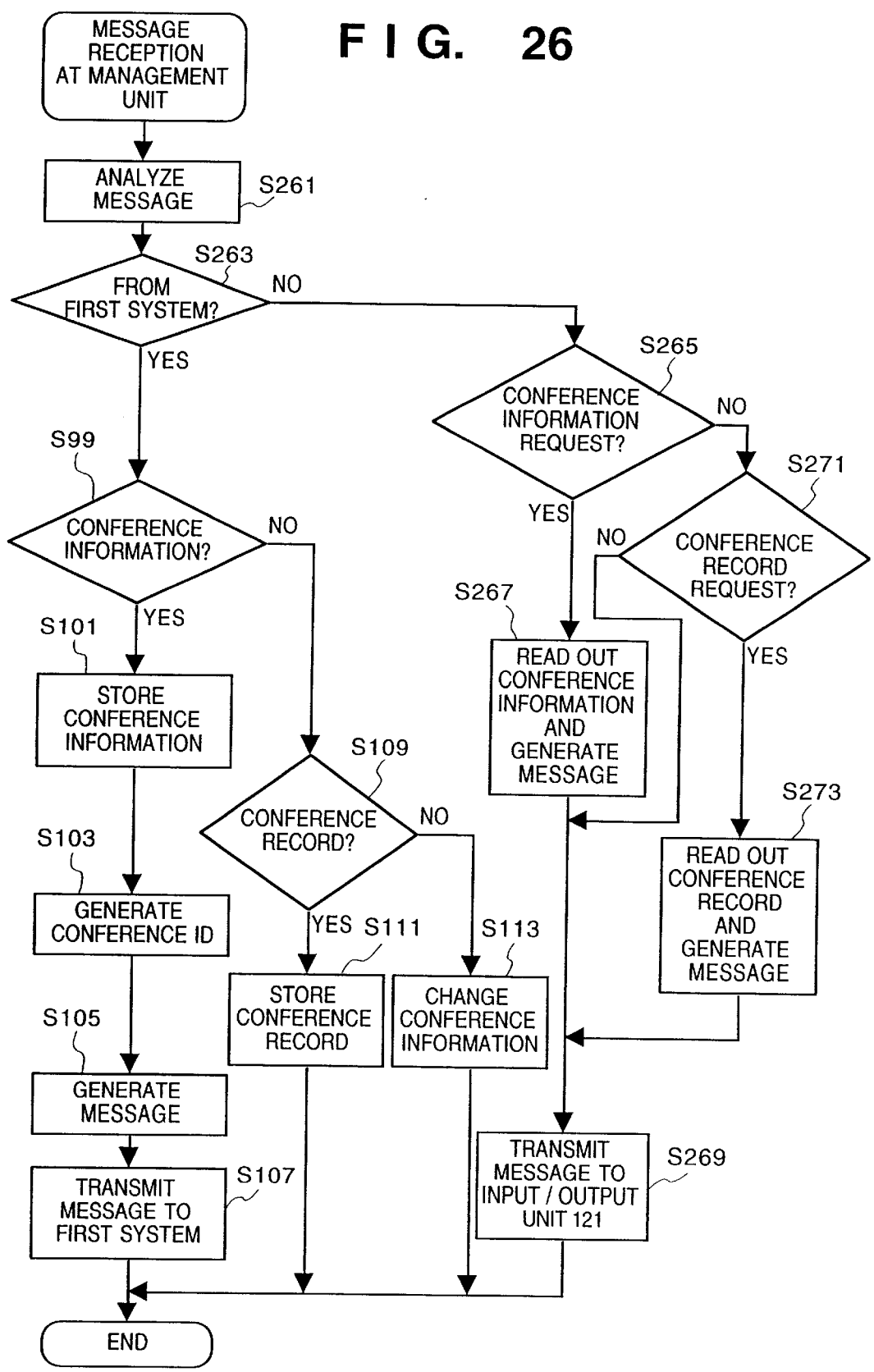
FIG. 26 is a flow chart of the message processing by the management unit of the second system in the second embodiment.

FIG. 26 shows the contents of step S287 in FIG. 25 in detail. Since this sequence has many steps common to those in FIG. 12, the same reference numerals denote the common processing steps.

Upon reception of a message, the message is analyzed in step S261, and it is then checked in step S263 if the transmission source is the first system 30. If YES in step S263, the flow advances to step S99. The processing in step S99 and the subsequent steps is the same as that in FIG. 12.

On the other hand, if the transmission source of the message is not the first system, it is determined that the message came from the input/output unit 121. It is checked in step S265 if the received message is a conference information request message. If YES in step S265, the conference information is read out from the storage module 72 to generate a conference information message in step S267. In step S269, the generated message is transmitted to the input/output unit 121.

If the message is not a conference information request message, it is checked in step S271 if the received message is a conference record request message. If YES in step S271, the conference record is read out from the storage module 73 to generate a conference record message in step S273. In step S269, the generated message is transmitted to the input/output unit 121.

If the received message is not a conference record request, it is determined that the message is a comment message, and that message is transferred to the input/output unit 121 in step S269.

With the above-mentioned sequence, the conference can be monitored from the second system. Furthermore, when the arrangement shown in FIG. 18 is used, the user who refers to the conference message and makes a comment need not attend to the terminal A0, and can operate from another arbitrary terminal (the terminal A3 in FIG. 18). The input/output unit 121 of the second system can be installed on a plurality of terminals, and a plurality of users can simultaneously make comments.

Third Embodiment

The second system 31 in the first embodiment can supply a resume message to the suspended conference using, e.g., an e-mail. In order to implement such function, a module for managing the resume time of the conference and a module for retrieving the resume time and distributing an e-mail to the participants of the conference are added to this embodiment.

Figure 19:
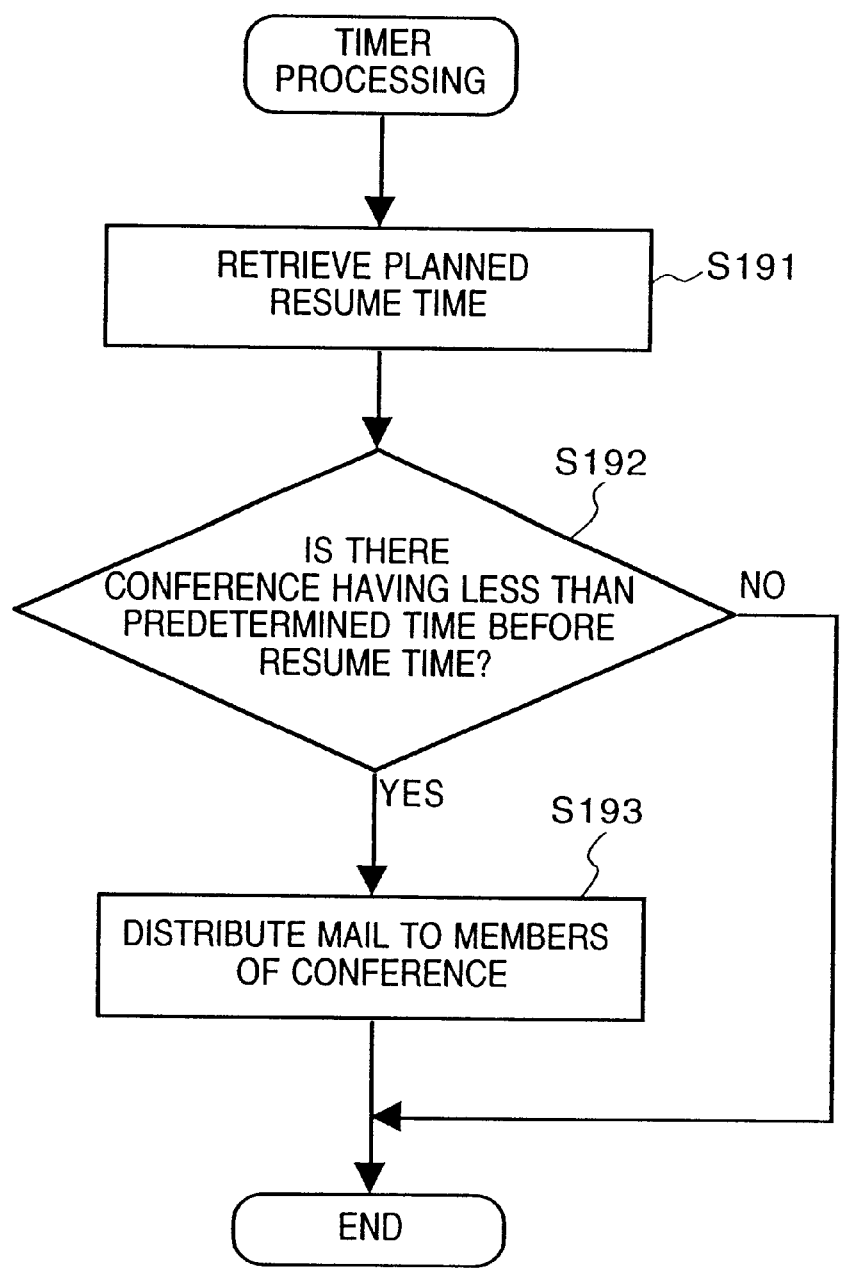
FIG. 19 is a flow chart of the processing for informing a resume plan of a conference in advance.

FIG. 19 is a flow chart in the second system 31 when a resume time message is issued by managing time by an internal timer of the terminal. The processing shown in FIG. 19 is implemented when the timer has expired, and is repeated at predetermined time intervals.

In step S191, the planned resume time is retrieved from the conference information shown in FIG. 17. It is checked in step S192 if there is a conference having less than a predetermined time before the resume time, e.g., less than 10 minutes before the resume time. If YES in step S191, a mail is distributed to the members registered in the conference information.

Note that the sequence shown in FIG. 19 is executed by the second system in the above description. However, the above-mentioned sequence can be executed by any terminals as long as they manage conference information.

The above-mentioned arrangement can automatically inform the participants of the conference of resume of the conference at an appropriate time.

In order to implement this function in the second embodiment, the sequence shown in FIG. 19 is executed by the management unit 120.

As described above, according to the present invention, the user can refer to the system history and can make a comment without joining any function such as a TV conference in progress, and the information sharing system can be managed efficiently.

In order to manage implementation of a function such as a conference, the status of the function is managed in three states "in progress", "suspend", and "end", and even when the status has changed, the latest status can be detected, thus efficiently executing system management.

Since information associated with a TV conference includes an identifier of the conference, a list of the names of members who participate in the conference, the start, suspend, or end time of the conference, and the like, the user can easily detect the contents of the conference, thus efficiently executing system management.

Since conference information and a conference record are formed as hypertexts, a history record can be efficiently referred to.

Since a message or e-mail is transmitted to members who are the attendants of a suspended conference that is scheduled to resume before the planned resume time, the conference or conference management can be efficiently implemented.

Since the system history such as a conference record is generated to include a hard copy of the screen image, audio data that can be acquired from the terminal, and text data input by the user, the contents can be quickly recognized, and the conference can be efficiently implemented.

The above embodiments have exemplified the TV conference management system that manages video conference systems. Also, the present invention can be used in, e.g., a case wherein the present invention is applied to a general information sharing system such as a groupware that shares information by a plurality of users, and its status is monitored externally.

Note that the present invention may be applied to either a system constituted by a plurality of equipments (e.g., a host computer, an interface device, a reader, a printer, and the like), or an apparatus consisting of a single equipment (e.g., a copying machine, a facsimile apparatus, or the like).

The objects of the present invention are also achieved by supplying a storage medium, which records a program code of a software program that can realize the functions of the above-mentioned embodiments to the system or apparatus, and reading out and executing the program code stored in the storage medium by a computer (or a CPU or MPU) of the system or apparatus.

In this case, the program code itself read out from the storage medium realizes the functions of the above-mentioned embodiments, and the storage medium which stores the program code constitutes the present invention.

As the storage medium for supplying the program code, for example, a floppy disk, hard disk, optical disk, magneto-optical disk, CD-ROM, CD-R, magnetic tape, nonvolatile memory card, ROM, and the like may be used.

The functions of the above-mentioned embodiments may be realized not only by executing the readout program code by the computer but also by some or all of actual processing operations executed by an OS (operating system) running on the computer on the basis of an instruction of the program code.

Furthermore, the functions of the above-mentioned embodiments may be realized by some or all of actual processing operations executed by a CPU or the like arranged in a function extension board or a function extension unit, which is inserted in or connected to the computer, after the program code read out from the storage medium is written in a memory of the extension board or unit.

Figure 20:
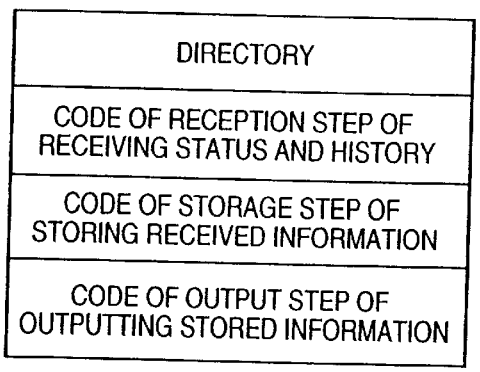
FIG. 20 shows a memory map that stores a program for implementing the present invention.
Figure 21A:
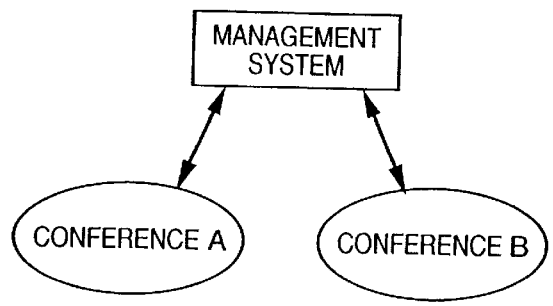
FIG. 21A shows an example for linking conferences A and B which are in progress.
Figure 21B:
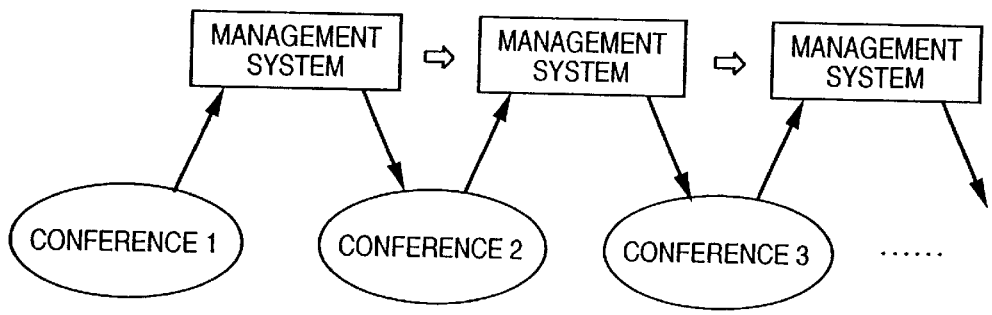
FIG. 21B shows a state wherein a certain conference repetitively suspends and resumes, and transits to conferences 1, 2, and 3.
Figure 21C:
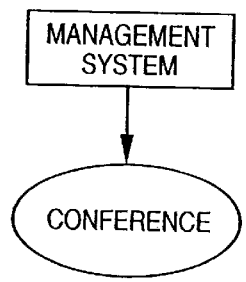
FIG. 21C shows a state wherein a certain user observers a conference in progress.

When the present invention is applied to the storage medium, the storage medium stores program codes corresponding to the above-mentioned flow charts. Briefly speaking, in this case, modules shown in an example of the memory map in FIG. 20 are stored in the storage medium.

That is, the storage medium can store at least program codes of modules of a code of the reception step of receiving status information and history information from an information sharing system, a code of the storage step of storing one or both the status information and history information received in the reception step in a storage means, and a code of the output step of reading out one or both the stored status information and history information of the information sharing system, and outputting status or history data of the information sharing system.

As many apparently widely different embodiments of the present invention can be made without departing from the spirit and scope thereof, it is to be understood that the invention is not limited to the specific embodiments thereof except as defined in the appended claims.

What is claimed is:

1. An apparatus for communicating with a video conference system in which plural terminals communicate with each other, said apparatus comprising;
   a display module, arranged to display an image concerning a communication in the video conference system;
   a communication module, arranged to communicate with the video conference system;
   a generator, arranged to generate history information of the communication among the plural terminals and/or status information of a present status of the video conference system in accordance with information received via said communication module;
   means for determining whether or not said communication module can communicate with the video conference in response to a request for transmission of the history information and/or the status information from a terminal other than the plural terminals; and
   means for transmitting the history information and/or status information generated by said generator in accordance with the received information when said communication module can communicate with the video conference system, and transmitting a copy of the image displayed by said display module when said communication module cannot communicate with the video conference system.

2. The apparatus according to claim 1, wherein the status information of the present information includes information representing at least one of start time of the video conference and time of the video conference, status of progress of the conference and participating members.

3. The apparatus according to claim 2, wherein the status of progress of the video conference indicates whether the conference is in progress, has been suspended, or has ended.

4. The apparatus according to claim 3, further comprising informing unit, arranged to inform the participating members of the video conference that a resume time of the conference has reached when the video conference is in suspension status.

5. The apparatus according to claim 1, wherein the third terminal does not participate in the video conference.

6. The apparatus according to claim 5, further comprising output device, arranged to output the status information of the present status of the video conference system stored by said storage via the network.

7. The apparatus according to claim 5, further comprising input device, arranged to input a comment generated by an operator via said communication module, and output device for outputting the comment input by said input device.

8. The apparatus according to claim 1, further comprising input means for inputting a comment generated by an operator, and output means for outputting the comment input by said input means.

9. The apparatus according to claim 8, wherein said input means inputs the comment by overwriting the comment on the history information.

10. The apparatus according to claim 1, wherein said generator generates the status information of the present information of the video conference as hypertexts that link elements included in the information.

11. The apparatus according to claim 1, wherein said generator generates the status information of the present status in correspondence with an identifier of the video conference system, and said storage stores the status information of the present status in correspondence with the identifier of the video conference system.

12. The apparatus according to claim 1, further comprising informing unit, arranged to inform the participating members of the video conference that a predetermined time has been reached.

13. A video conference system constructed by combining plural terminals including at least two terminals according to claim 1.

14. A method for controlling a terminal communicating with a video conference system in which plural terminals communicate with each other, said method comprising the steps of:

displaying an image concerning a communication in the video conference system;

determining whether or not a communication can be performed with the video conference in response to a request from a terminal other than the plural terminals for transmission of the history information of the communication among the plural terminals and/or status information of a present status of the video conference system;

generating the history information and/or the status information in accordance with information received via a communication when the communication with the video conference system can be performed;

transmitting the history information and/or status information generated in the generating step when said communication module can communicate with the video conference system and transmitting a copy of the image displayed by said display module when the communication with the video conference system cannot be performed.

15. The method according to claim 14, wherein the status information of the present invention includes information representing at least one of start time of the video conference, and time of the video conference, status of progress of the conference, and participating members.

16. The method according to claim 15, wherein the status of progress of video conference indicates whether the conference is in progress, has suspended, or has ended.

17. The method according to claim 16, further comprising informing step of informing the participating members of the video conference that a resume time of the conference has reached when the video conference is in suspension status.

18. The method according to claim 14, wherein wherein the third terminal does not participate in the video conference.

19. The method according to claim 18, further comprising an outputting step of outputting the status information of the present status of the video conference system stored in said storing step via the network.

20. The method according to claim 18, further comprising an inputting step of inputting a comment inputted by an operator and an outputting step of outputting the comment input in said inputting step via the network.

21. The method according to claim 14, further comprising an inputting step of inputting a comment generated by an operator and an outputting step of outputting the comment input in said inputting step.

22. The method according to claim 21, wherein the comment is inputted in said inputting step by overwriting the comment on the present status.

23. The method according to claim 14, wherein the status information of the present status is generated as hypertexts that link elements included in the information in said generating step.

24. The method according to claim 14, wherein the status information of the present status is generated in correspondence with an identifier of the video conference system, and the status information of the present status is stored in correspondence with the identifier of the video conference system.

25. The method according to claim 14, further comprising informing step of informing the participating members of the video conference that predetermined time has reached.

26. A computer readable storage medium on which a computer program to make a computer perform the method according to claim 14 is stored.

27. An apparatus on which a video conference system for communicating with a terminal runs, the apparatus comprising:

a display, arranged to display an image concerning a communication in the video conference system:

a generator, arranged to generate history information of the communication with the other terminal and/or status information of a present status by communicating with the video conference system;

a determination unit, arranged to determine whether or not a communication with the video conference system can be performed in response to a request from a terminal which does not communicate in the video conference system, for transmission of the history information and/or the status information generated by the generator; and a transmitter, arranged to transmit a copy of the image displayed by the display when the apparatus cannot communicate with the video conference system.

28. A method of controlling an apparatus on which a video conference system for communicating with a terminal runs, the method comprising the steps of:

displaying an image concerning a communication in the video conference system;

generating history information of the communication with the other terminal and/or status information of a present status by communicating with the video conference system;

determining whether or not a communication with the video conference system can be performed in response to a request from a terminal which does not communicate in the video conference system, for transmission of the history information and/or the status information generating step; and transmitting a copy of the image displayed in the displaying step when the apparatus cannot communicate with the video conference system.

* * * * *

UNITED STATES PATENT AND TRADEMARK OFFICE
CERTIFICATE OF CORRECTION

PATENT NO. : 6,587,870 B2
DATED : July 1, 2003
INVENTOR(S) : Takagi et al.

It is certified that error appears in the above-identified patent and that said Letters Patent is hereby corrected as shown below:

<u>Title page,</u>
Please add -- Related U.S. Application Data
[63] CPA of US application no. 08/959,875 filed October 29, 1997 --

Signed and Sealed this

Twenty-third Day of December, 2003

JAMES E. ROGAN
*Director of the United States Patent and Trademark Office*